US011351613B2

(12) United States Patent
Firdosy et al.

(10) Patent No.: US 11,351,613 B2
(45) Date of Patent: Jun. 7, 2022

(54) MAGNETIC ELEMENTS AND METHODS FOR THE ADDITIVE MANUFACTURE THEREOF

(71) Applicant: California Institute of Technology, Pasadena, CA (US)

(72) Inventors: Samad A. Firdosy, La Crescenta, CA (US); Robert P. Dillon, Long Beach, CA (US); Ryan W. Conversano, Tarzana, CA (US); John Paul C. Borgonia, Monrovia, CA (US); Andrew A. Shapiro-Scharlotta, Glendale, CA (US); Bryan W. McEnerney, Redondo Beach, CA (US); Adam Herrmann, Piqua, OH (US)

(73) Assignee: California Institute of Technology, Pasadena, CA (US)

( * ) Notice: Subject to any disclaimer, the term of this patent is extended or adjusted under 35 U.S.C. 154(b) by 220 days.

(21) Appl. No.: 16/429,986

(22) Filed: Jun. 3, 2019

(65) Prior Publication Data

US 2019/0366435 A1 Dec. 5, 2019

Related U.S. Application Data

(60) Provisional application No. 62/679,358, filed on Jun. 1, 2018.

(51) Int. Cl.
*B22F 3/105* (2006.01)
*B22F 10/20* (2021.01)
(Continued)

(52) U.S. Cl.
CPC .......... *B22F 10/20* (2021.01); *C22C 33/0207* (2013.01); *C22C 38/10* (2013.01); *B22F 2003/248* (2013.01); *C22C 2202/02* (2013.01)

(58) Field of Classification Search
None
See application file for complete search history.

(56) References Cited

PUBLICATIONS

Turgut (J. Appl. Phys. 2008, vol. 103, 07E724). (Year: 2008).*

(Continued)

*Primary Examiner* — Xiaowei Su
(74) *Attorney, Agent, or Firm* — KPPB LLP

(57) ABSTRACT

Elements formed from magnetic materials and their methods of manufacture are presented. Magnetic materials include a magnetic alloy material, such as, for example, an Fe—Co alloy material (e.g., the Fe—Co—V alloy Hiperco-50®). The magnetic alloy materials may comprise a powdered material suitable for use in additive manufacturing techniques, such as, for example direct energy deposition or laser powder bed fusion. Manufacturing techniques include the use of variable deposition time and energy to control the magnetic and structural properties of the materials by altering the microstructure and residual stresses within the material. Manufacturing techniques also include post deposition processing, such as, for example, machining and heat treating. Heat treating may include a multi-step process during which the material is heated, held and then cooled in a series of controlled steps such that a specific history of stored internal energy is created within the material. Magnetic elements may include, for example, motors, generators, solenoids and switches, sensors, transformers, and hall thrusters, among other elements.

17 Claims, 25 Drawing Sheets

(51) Int. Cl.
*C22C 38/10* (2006.01)
*C22C 33/02* (2006.01)
*B22F 3/24* (2006.01)

(56) References Cited

PUBLICATIONS

Conversano et al., "Development and Initial Testing of a Low-Power Magnetically Shielded Hall Thruster with an Internally-Mounted Hollow Cathode", Proceedings of the 35th International Electric Propulsion Conference, 2017, 18 pgs.

Conversano et al., "Development and Initial Testing of a Magnetically Shielded Miniature Hall Thruster", IEEE Transactions on Plasma Science, Jan. 2015, vol. 43, No. 1, pp. 103-117, doi: 10.1109/TPS.2014.2321107.

Geng et al., "Bulk Combinatorial Synthesis and High Throughput Characterization for Rapid Assessment of Magnetic Materials: Application of Laser Engineered Net Shaping (LENSTM)", The Journal of The Minerals, Metals & Materials Society, Jul. 2016, vol. 68, No. 7, pp. 1972-1977.

Hailer, "Effect of Heat Treatment on Magnetic and Mechanical Properties of an Iron-Cobalt-Vanadium-Niobium Alloy", Master Thesis, Virginia Polytechnic Institute, 2001, 24 pgs.

Horwath et al., "High Temperature Properties and aging-stress related changes of FeCo Materials", AFRL Technical report, Jul. 2006, AFRL-PR-WP-TR-2006-2176, 130 pgs.

Kustas et al., "Characterization of the Fe—Co-1.5 soft ferromagnetic alloy processed by laser engineered net shaping", Additive Manufacturing, May 2018, vol. 21, pp. 41-52, doi: 10.1016/j.addma.2018.02.006.

Mikler et al., "Laser Additive Manufacturing of Magnetic Materials", The Journal of The Minerals, Metals & Materials Society, Jan. 27, 2017, vol. 69, No. 3, pp. 532-543.

Sourmail, "Near equiatomic FeCo alloys: constitution,mechanical and magnetic properties", Progress in Materials Science, Sep. 2005, vol. 50, No. 7, pp. 816-880, doi: 10.1016/j.pmatsci.2005.04.001.

Sundar et al., "Soft magnetic FeCo alloys: alloy development, processing, and properties", International Materials Reviews, 2005, vol. 50, No. 3, pp. 157-192, doi: 10.1179/174328005X14339.

Vovrosh et al., "Additive manufacturing of magnetic shielding and ultra-high vacuum flange for cold atom sensors", Scientific Reports, Jan. 31, 2018, vol. 8, No. 2023, 10 pgs.

Yu et al., "High temperature soft magnetic materials: FeCo alloys and composites", IEEE Transactions on Magnetics, Sep. 2000, pp. 3388-3393, doi: 10.1109/20.908809.

Zhang et al., "Studies of magnetic properties of permalloy (Fe-30% Ni) prepared by SLM technology", Journal of Magnetism and Magnetic Materials, Feb. 2012, vol. 324, No. 4, pp. 495-500, available online Sep. 1, 2011, doi: 10.1016/j.jmmm.2011.08.030.

\* cited by examiner

| Build | As Printed | | | | Anneal | Annealed | | |
|---|---|---|---|---|---|---|---|---|
| | B (T) | Max Test B (T) | H_c (Oe) | $\mu_{max}$ | | B (T) | Max Test B (T) | H_c (Oe) | $\mu_{max}$ |
| Low | 1.135 | 2.279 | 9.539 | 656 | 4h/838°C | 1.456 | 2.389 | 0.723 | 9969 |
| Low | 1.089 | 2.218 | 9.768 | 604 | 4h/865°C | 1.391 | 2.392 | 0.746 | 12616 |
| Medium | 1.202 | 2.307 | 7.169 | 886 | 4h/838°C | 1.462 | 2.398 | 0.918 | 8690 |
| Medium | 0.176 | 2.289 | 7.529 | 823 | 4h/865°C | 1.503 | 2.387 | 0.945 | 8886 |
| High | 1.306 | 2.353 | 6.765 | 1208 | 2h/838°C | 1.556 | 2.395 | 2.25 | 3826 |
| High | 1.199 | 2.351 | 8.052 | 904 | 2h/838°C | 1.536 | 2.387 | 1.522 | 5201 |
| High | 1.249 | 2.372 | 7.725 | 1092 | 2h/838°C | 1.543 | 2.402 | 1.747 | 4576 |
| High | 1.241 | 2.314 | 6.548 | 1001 | 4h/838°C | 1.481 | 2.389 | 1.097 | 9584 |
| High | 1.211 | 2.301 | 6.819 | 940 | 4h/865°C | 1.506 | 2.388 | 1.099 | 7597 |

FIG. 7b

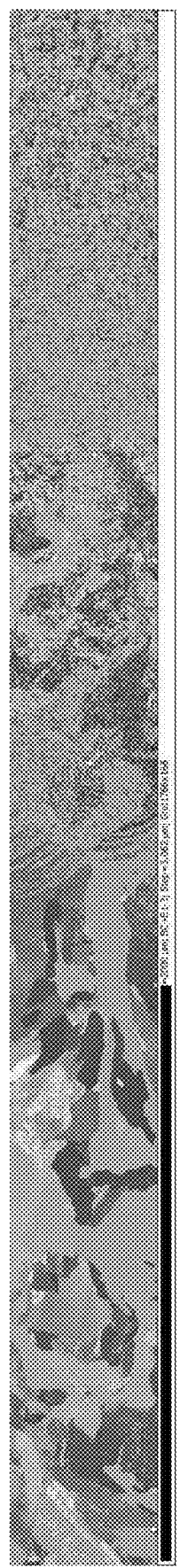
FIG. 8b
FIG. 8c

EBSD image for medium power build post anneal

EBSD image for low power build post anneal

Build direction

Top surface view – as deposited - 122

Top surface view – as deposited - 222

Top surface view – as deposited - 312

High energy density
Avg melt pool width: 778 um (87um stdev)
Avg melt pool depth: 305 um (44um stdev)

Low energy density
Avg melt pool width: 541 um (43 um stdev)
Avg melt pool depth: 228 um (23 um stdev)

MAGNETIC ELEMENTS AND METHODS FOR THE ADDITIVE MANUFACTURE THEREOF

REFERENCE TO RELATED APPLICATIONS

This application claims priority to U.S. Provisional Patent Application No. 62/679,358, filed Jun. 1, 2018, the disclosure of which is incorporated herein by reference.

STATEMENT OF FEDERAL SUPPORT

The invention described herein was made in the performance of work under a NASA contract NNN12AA01C, and is subject to the provisions of Public Law 96-517 (35 USC 202) in which the Contractor has elected to retain title.

FIELD OF THE INVENTION

The current disclosure is directed generally to elements having \ magnetic properties and methods for their additive manufacture.

BACKGROUND OF THE INVENTION

Soft magnetic alloys (e.g., Fe—Co—V alloys such as Hiperco® 50) are commonly used for magnetic shielding in elements such as Hall thrusters. These materials are also used within industry to increase functionality, margin, and/or reliability of motors, generators, solenoids and switches, sensors, transformers, and magnetic disk read heads, etc. This is because these soft magnetic alloy materials have high magnetic saturation, high permeability, low coercivity, and low core loss. Unfortunately, while such alloys demonstrate excellent magnetic properties, they also tend to be brittle, making it difficult to machine these materials. Moreover, the hallmark magnetic properties of these alloys are subject to degradation during manufacture and subsequent processing. For example, groups studying such materials have reported the strong deterioration of magnetic properties of ordered intermetallic Fe—Co—V alloys when they are subjected to mechanical strengthening. (See, e.g., Hug, et al., *J. Magnetism & Magnetic Materials*, 215-216 (2000) 197-200, the disclosure of which is incorporated herein by reference.)

BRIEF SUMMARY OF THE INVENTION

The application is directed to elements having magnetic properties and methods for their additive manufacture.

Many embodiments are directed to methods for forming an element having magnetic properties including:
  providing a powderized feedstock of a magnetic alloy;
  additively manufacturing a magnetic element having a density of at least 98% from a plurality of successive layers of deposited powderized feedstock using a thermal energy source having a specific energy of deposition between about 30 and 60 J/mm$^2$; and
  heat treating the magnetic element comprising:
    annealing the magnetic element in a vacuum atmosphere at a temperature between about 830° C. and 875° C. for at least 4 hours±10 minutes,
    quenching the annealed magnetic element to at least below 500° C.±20° C. at a cooling rate of at least 80° C./hour±10° C./hour in a vacuum atmosphere, and
    cooling the quenched magnetic element to at least below a temperature of 100° C.±20° C. in an atmosphere having a concentration of oxygen less than about 10 ppm;
  wherein the heating and cooling of the magnetic element during the additive manufacturing and heat treating creates and changes the internal energy that at least partially determines the grain structure of the magnetic alloy of the magnetic element.

In still many embodiments, the magnetic alloy is a Fe—Co alloy.

In yet many embodiments, the magnetic alloy further comprises V.

In still yet many embodiments, the magnetic alloy is Hiperco® 50.

In still yet many embodiments, wherein the vacuum atmosphere has a pressure below 1×10$^{-4}$ Torr.

In still yet many embodiments, the minimum temperature is at least 865° C.±20° C.

In still yet many embodiments, the cooling is conducted in a partial atmosphere of an inert gas.

In still yet many embodiments, the additive manufacturing process is selected from the group of direct energy deposition (DED) or powder bed fusion (PBF).

In still yet many embodiments, the thermal energy source is a laser.

In still yet many embodiments, the method further includes modifying the internal energy of the magnetic alloy prior to the heat treating such that a desired grain structure will be formed in the magnetic alloy of the heat treated magnetic element.

In still yet many embodiments, the internal energy is modified by controlling a thermal energy source parameter selected from the group of spot size, raster speed, and power.

In still yet many embodiments, the grain structure of the magnetic alloy is varied within the magnetic element.

In still yet many embodiments, the grain structure varies along a radial direction of the magnetic element.

In still yet many embodiments, the variance of the grain structure leads to variance in one or both of a magnetic property of the magnetic alloy, selected from the group of coercivity, permeability, magnetic saturation, core loss and flux density; and a mechanical property of the magnetic alloy selected from the group of hardness and strength.

In still yet many embodiments, the method further comprises:
  providing at least one additional feedstock alloy; and
  varying the composition of the alloy being additively manufactured between at least the one additional feedstock alloy and the magnetic alloy such that the magnetic element has at least a first portion formed from the magnetic alloy, at least a second portion formed from the at least one additional alloy, and at least a third portion formed by compositional gradients therebetween.

In still yet many embodiments, the magnetic alloy is an Fe—Co alloy and the at least one additional alloy is selected from the group of stainless steel alloys and ferrous metal alloys.

In still yet many embodiments, there are at least two additional feedstock alloys.

In still yet many embodiments, the magnetic element is selected from the group of: motors, generators, solenoids and switches, sensors, transformers, and Hall thrusters.

Various embodiments are directed to magnetic elements including:
  a body formed from a plurality of successive additively bonded layers of at least a magnetic alloy comprising at least Fe and Co, wherein the body has a density of at least 98%, and a maximum magnetic flux density of at least 2 Nm, a coercivity of less than 1.1 Oe, and a permeability of greater than 7000 H/m.

In still various embodiments, the body further comprises a plurality of successive additively bonded layers of at least one additional alloy, such that the body has at least a first portion formed from the magnetic alloy, at least a second portion formed from the at least one additional alloy, and at least a third portion formed by compositional gradients therebetween.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 7b provides a table summarizing the data graph of FIG. 7a.

FIGS. 8b and 8c provide a SEM images of a gradient magnetic element in accordance with embodiments of the invention.

FIGS. 9k and 9l provide images of powder cross-section and ring section for: (9k) Hiperco® 50, and (9l) FeCo in accordance with embodiments of the invention.

DETAILED DESCRIPTION OF THE INVENTION

Figure 1:
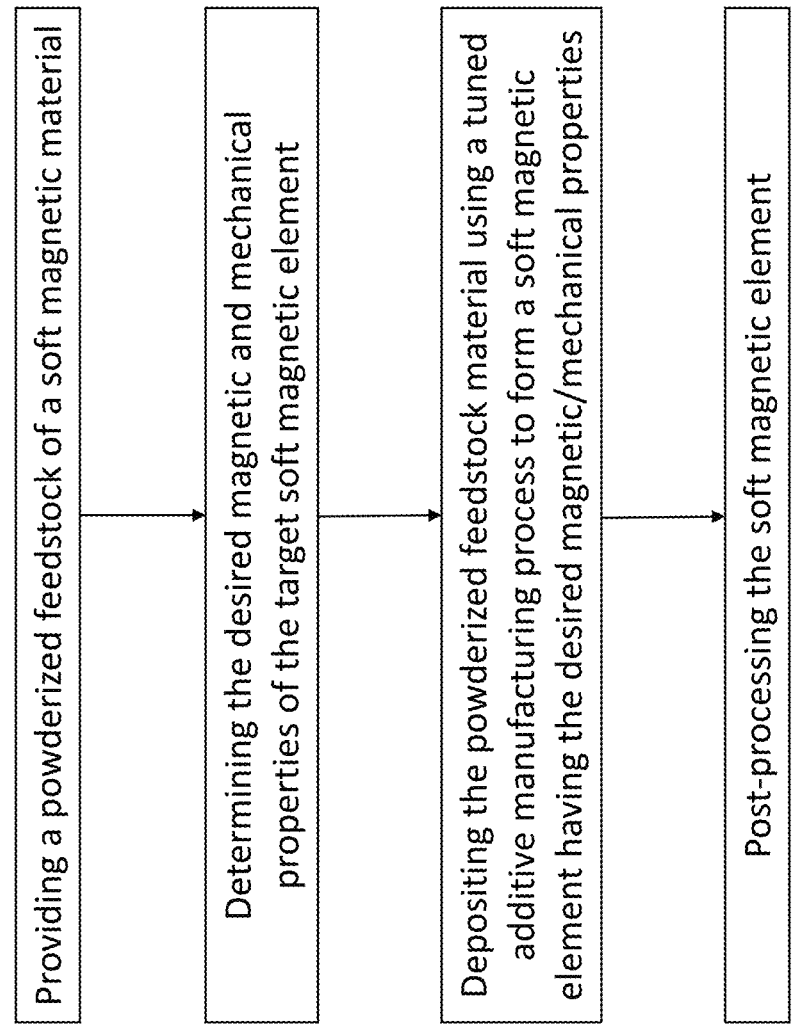
FIG. 1 provides a flow-chart of a process for additively manufacturing magnetic elements in accordance with embodiments of the invention.

Turning now to the drawings, elements formed from magnetic materials and their methods of manufacture are described. In various embodiments, the magnetic materials comprise a magnetic alloy material, such as, for example, an Fe—Co alloy material (e.g., the Fe—Co—V alloy Hiperco-50®). In many embodiments, the magnetic alloy materials may comprise a powdered material suitable for use in additive manufacturing techniques, such as, for example direct energy deposition or laser powder bed fusion. Various embodiments are also directed to methods of manufacturing elements formed from magnetic materials. Many embodiments of manufacturing techniques comprise the use of variable deposition time and energy to control the magnetic and structural properties of the materials by altering the microstructure and residual stresses within the material. Manufacturing techniques according to some embodiments include post deposition processing, such as, for example, machining and heat treating. Heat treating embodiments may include a multi-step process during which the material is heated, held and then cooled in a series of controlled steps such that a specific history of stored internal energy is created within the material. In various embodiments, the magnetic elements formed according to methods have magnetic properties that exceed the state-of-the-art for similarly machined parts. Magnetic properties (e.g., coercivity) and mechanical properties (e.g., hardness) of elements can be tailored using additive manufacturing and heat treatment to architect final microstructure according to embodiments. It will be understood that magnetic elements according to embodiments may include, for example, motors, generators, solenoids and switches, sensors, transformers, and Hall thrusters, among other elements.

The described apparatuses, systems, and methods should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatuses can be used in conjunction with other systems, methods, and apparatus.

State-of-the-art soft magnetic alloys such as the Fe—Co—V alloy Hiperco® 50 are used for magnetically shielding applications, such as in motors, generators, solenoids and switches, sensors, transformers, magnetic disk read heads, and Hall thrusters. These materials are also used by industry to increase functionality, margin, and/or reliability of these elements. This is because these materials generally have high magnetic saturation, high permeability, low coercivity, and low core loss. Unfortunately, these state-of-the-art materials also tend to be brittle, making it difficult to machine these materials. What is more, the magnetic properties are very sensitive to how they are processed, and can be significantly degraded during such processing.

To address the issues that arise in working with these materials during manufacture, some groups have attempted to manufacture parts from such magnetic alloys via additive manufacturing (AM), or 3D printing, from powder using direct energy deposition or similar laser based AM process. However, these early attempts have met with mixed results. Although elements having near-net shape were formed, the magnetic properties of elements formed using such techniques was determined to be sub-optimal. (See, e.g., Kustas, et al., *Additive Manufacturing,* 21 (2018) 41-52, the disclosure of which is incorporated herein by reference.)

Embodiments of the instant disclosure are directed to methods for implementing additive manufacturing techniques to enable near-net fabrication of difficult to machine state-of-the-art magnetic materials for elements such as, for example, motors, generators, solenoids and switches, sensors, transformers, and Hall thrusters having excellent mechanical and magnetic properties that are tunable for specific implementations, and the magnetic elements formed thereby.

Embodiments Implementing Methods of Manufacturing Soft Magnetic Elements

Turning to the drawings, many embodiments are directed to methods of manufacturing elements with magnetic properties via an additive manufacturing process. As shown in FIG. 1, in many embodiments the process comprises the general steps of preparing a feedstock of a powderized magnetic alloy material, depositing the powderized magnetic material through a suitable additive manufacturing process to form a magnetic element, and post-processing the formed magnetic element through at least a heat treatment process.

Figure 2:
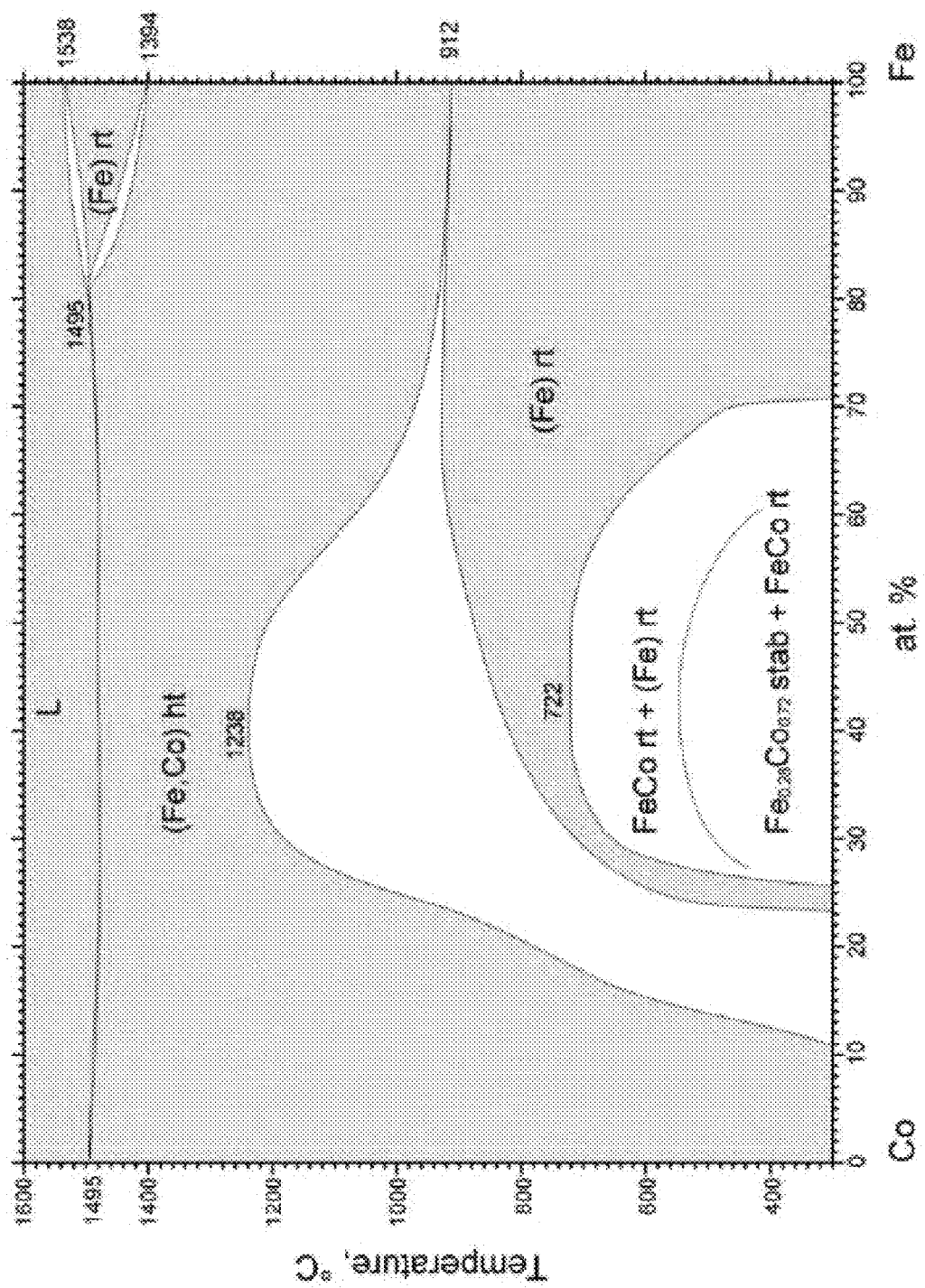
FIG. 2 provides a data graph of the equilibrium thermodynamic phase diagram of Fe—Co materials in accordance with the prior art.

In many embodiments, the feedstock comprises an alloy having magnetic properties. Although any suitable magnetic metal alloy (e.g., an alloy having a very high maximum magnetic saturation and very low magnetic coercivity) capable of being powderized and deposited using an additive manufacturing process may be used, in many embodiments the alloy comprises at least Fe and Co as represented by the binary equilibrium phase diagram summarized in FIG. 2. These Fe—Co alloys show very high magnetic permeability, low coercivity, high saturation and high Curie temperature. Although Fe—Co alloys have excellent magnetic properties, they are notoriously brittle and difficult to machine, which limits their usefulness. Accordingly, conventionally Fe—Co alloys are alloyed with one or more materials to improve manufacturability, such as, for example, V. One exemplary Fe—Co—V alloy is Hiperco® 50 manufactured by Carpenter Powder Products, the composition of which is given in Table 1, below. Despite the widespread use of such trenary and higher-order alloys, the improved formability/machinability comes at the expense of the magnetic, electrical and thermal properties of the base Fe—Co binary alloy. In short, the binary Fe—Co alloy has better magnetic, electrical and thermal properties as compared to Hiperco® 50 (Fe-49Co-2V), but is not used due its very poor formability/machinability. Vanadium is added to improve the mechanical properties and poor formability/machinability at the expense of magnetic, electrical and thermal properties. Implementing additive manufacturing to form near net shape magnetic elements, according to embodiments, allows for the use of higher magnetic performance Fe—Co materials. Accordingly, embodiments of the current disclosure advantageously may be used with any suitable magnetic alloy, including Fe—Co—V alloys as well as the conventionally unavailable Fe—Co alloys.

TABLE 1

| Composition of Carpenter Mirco-Melt ® Hiperco ® 50 | | | | | | | | | | | | | |
|---|---|---|---|---|---|---|---|---|---|---|---|---|---|
| Fe | Co | V | Si | Ni | Cr | Mn | P | Mo | Al | C | S | O | N |
| BAL | 48.79 | 1.76 | 0.01 | 0.04 | 0.01 | 0.02 | 0.004 | 0.01 | 0.001 | 0.005 | 0.002 | 0.0235 | 0.003 |

Various additive manufacturing techniques suitable for forming a bulk object, layer-by-layer, at near net shape to finished dimensions, using a magnetic metal alloy materials may be used. In various embodiments, the process may be an energetic emission (e.g., laser, e-beam, etc.) based process, such as, for example direct energy deposition (DED) or powder bed fusion (PBF). DED and PDF are additive manufacturing processes in which focused thermal energy is used to fuse materials. While lasers may be the most popular "focused thermal energy" source for these processes, electron beam and plasma arc systems may also be used in accordance with embodiments.

Although both DED and PBF use an energetic energy source to heat a feedstock, there are some differences. In powder-fed DED, the material being fused is deposited by "blowing" metallic powder through small nozzles or orifices into a melt pool created by the energetic source (e.g., laser). Depending on the power and type of energetic source being used, the energetic source beam is focused to create a known spot size (for example, in a laser-based system the spot size may be 0.5 or 1 mm for a 500-watt laser versus 1.5 or 3 mm for a 2.5-kilowatt laser). The depth and velocity of the resulting melt pool are dictated by the scan speed of the laser (or movement of the part on the build platform underneath the laser), and the energy absorption and thermal conductivity of the feedstock that is being deposited. The size of the melt pool, the speed at which the laser moves and the powder feed rate (the rate at which powder is blown through the nozzles toward the laser) dictate how much powder is captured in the melt pool and ultimately how much material is fused to the part—the layer beneath as well as adjacent material within the layer currently being built. A large, hot, slow-moving melt pool will have a higher powder capture rate (70% to 80%, which is the best case) than a smaller or faster moving melt pool (20% to 30% capture rate, which is the worst case). However, the thermal history and therefore the microstructure and mechanical properties of the part will be different in the two cases. This is one of the challenges with DED, namely, tuning process parameters to ensure a fast build time, efficient use of powder, and a part that is dimensionally accurate. The main difference with PBF processes is that while in DED material is only deposited where needed (e.g., within the melt pool created by the energetic emission source), in PBF each layer requires a new layer of powder to be spread. This generally makes PBF systems slower, but in exchange there is generally better resolution and surface finish.

Regardless of the specific additive manufacturing technique used, it will be understood that by adjusting process parameters (e.g., energy density of laser energy or raster time), the as-printed microstructure of a formed element may be altered to allow the formation of larger or smaller grains after post-processing annealing. In various embodiments, the thermal history of the formed element may be controlled by altering the spot size, raster speed, power, and laser movement during manufacture. Various embodiments have a specific energy of deposition (e.g., laser energy) of between about 30 and 60 J/mm$^2$ such that full density additively manufactured elements (e.g., at least greater than ~98%, which is required under ASTM A773 for DC magnetic elements) are formed. Test data showing energy density requirements to form fully dense elements according to some embodiments are provided in Table 2, below.

TABLE 2

Additive Manufacturing Processing Parameters

| Laser Power (W) | Build Velocity (mm/s) | Specific Energy (J/mm$^2$) | Density (%) |
| --- | --- | --- | --- |
| 650 | 16.9 | 38 | 99 ± 1.0 |
| 1070 | 16.9 | 36 | 99 ± 1.0 |
| 1680 | 16.9 | 46 | 99 ± 1.0 |

Figure 3:
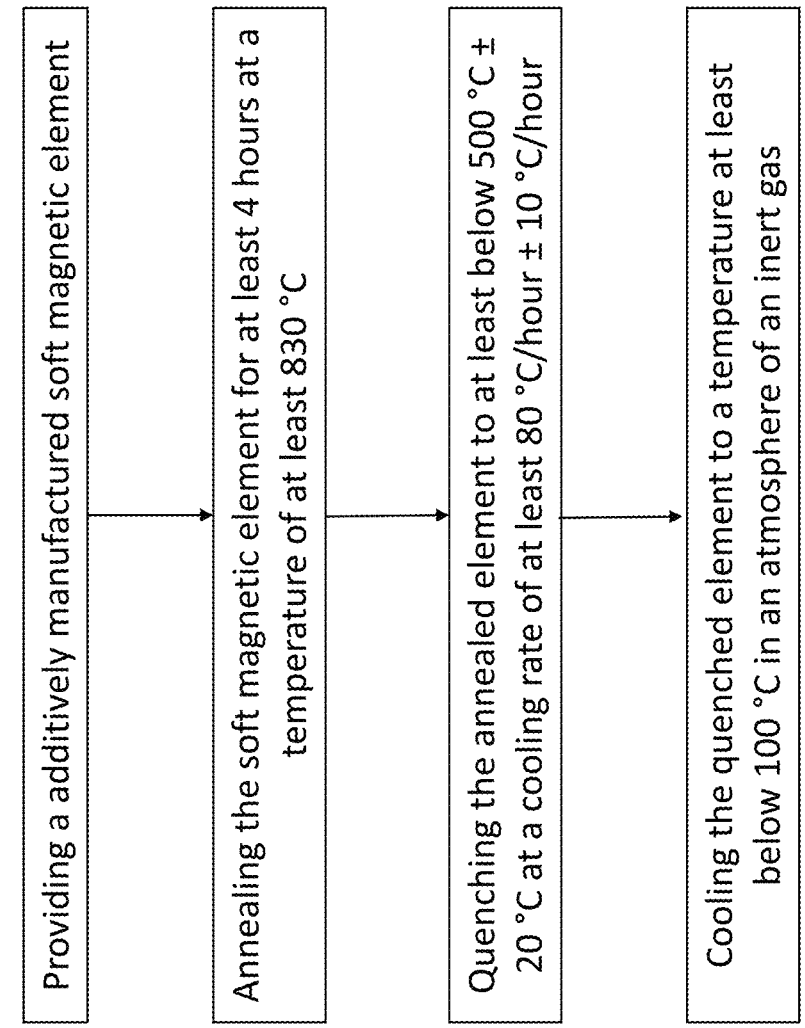
FIG. 3 provides a flow-chart of a heat-treatment process for additively manufacturing magnetic elements in accordance with embodiments of the invention.

Turning to the post-process heat treatment, as shown in the flow-chart provided in FIG. 3, the process generally comprises at least three steps:

annealing of the solidified element at a heat treatment temperature for a set period of time to allow the grain structure to stabilize in a desired configuration;

an initial fast cooling or quenching process to bring the temperature of the element below an initial threshold temperature; and a second slower cooling process to bring the temperature of the element below a second threshold temperature.

In various embodiments the annealing step requires the formed element to be held at at least 830° C. but without exceeding about 875° C. for at least 4 hours±10 minutes. In other embodiments the minimum temperature is 865° C.±20° C. In many embodiments the annealing is conducted in a vacuum. In many such embodiments the vacuum atmosphere has a maximum pressure of 1×10$^4$ Torr. In many embodiments the initial quenching process involves cooling the annealed element from the annealing temperature to at least below 500° C.±20° C. at a cooling rate of at least 80° C./hour±10° C./hour. In many embodiments the second cooling step involves air cooling the quenched element to at least below a temperature of 100° C.±20° C. In many such embodiments the air cooling is conducted in a partial atmosphere of inert gas, such as, for example, argon where the concentration of oxygen in the atmosphere is preferably less than 10 ppm. The importance of a suitable heat-treatment process on the properties of the elements formed in accordance with embodiments is summarized in the Exemplary Embodiments, below.

Although specific heat treatment parameters are described above, it will be understood that the annealing and quenching steps may be modified to ensure a desired grain structure is achieved in the as-formed element, as will be described in greater detail below. It will be also understood that other post-process machining steps may be included in the process including, for example, grinding, sanding, buffing, drilling, cutting, etc.

During the additive manufacturing deposition (e.g., DED, PBF, etc), the process involves melting the target metal alloy via heating (e.g., by a laser emission), then solidifying the material via cooling, and then heat treating (e.g., annealing) the formed sample in a post-processing step. These heating and cooling cycles create an energy history and stored internal energy in the formed element. Generally, the faster the element cools, the higher the stored internal energy in the element. This internal energy can be used to recrystallize and grow grains during later heat treatment. In summary, the higher the cooling rate during additive manufacture the lower the temperature needed to recrystallize the metal and fall within the grain growth regime during heat treatment. As will be discussed in greater detail below, this thermal history relationship means that in embodiments in which the heating/cooling is set at a faster rate, the post-processing heat treatment will grow grains within the deposited material at a lower temperature allowing for a longer time for grain growth. In some embodiments the thermal history of the pre-heat treated element may be varied by altering the nature of the laser emission (e.g., by altering the laser spot size, raster speed, power, movement or layer thickness) such that faster or slower cooling of the element is achieved.

Embodiments incorporating such thermal history control allow for the engineering of grain growth to obtain either fine or coarse grain structure, wherein materials formed with a coarse grain structure have fewer grain boundaries making it easier to magnetize (e.g., lower coercivity), and materials formed with a fine grain structure have more grain boundaries making it harder to magnetize (e.g., higher coercivity). At the same time, smaller grain sizes generally leads to stronger mechanical properties because the small grain leads to a greater number of grain boundaries that in turn operate within the material to prevent dislocation motion. Accordingly, by varying the thermal history during deposition, according to embodiments, it is possible to control the grain of the soft magnetic material (e.g., creating smaller, larger, or mixed grains within elements) which, in turn allows for the control of the magnetic properties (e.g., coercivity, permeability, etc.) and the mechanical properties (e.g., hardness, strength, etc.) of an as-formed element.

Accordingly, embodiments employing microstructure control allow for the properties of the soft magnetic element to be engineered at the design stage and optimized for a specific application. For example, magnetic texture may be leveraged to improve the performance of magnetically shielded hall thrusters by considering such texture in the design of the magnetic circuit. Furthermore, the additive manufacturing process allows unique processing considerations, such as radial deposition, that could enable radial texturing of the magnetic properties potentially useful for the magnetic circuit and otherwise not achievable using traditional manufacturing processes.

Moreover, for larger elements (such as, for example, Hall thrusters) that conventionally utilize bolted interfaces to join different metal alloys, such as vacuum induction melted, vacuum arc remelted (VIMVAR) iron and Fe—Co—V, embodiments implementing variable grain growth additive manufacturing allow for the fabrication of monolithic structures with compositional and microstructural gradients to control property distribution through the transition, eliminating the need for bolted joints, and improving system performance and reliability. Furthermore, compositional gradients between different materials (e.g., soft magnetic alloys (e.g., Fe—Co/Fe—Co—V) and weldable ferrous metal alloys (e.g. stainless steel)) can also facilitate reliable joining of annealed soft magnetic alloy materials without degradation of the magnetic properties from welding.

In summary, embodiments provide systems and methods allowing for the use of various additive manufacturing processes to enable the near-net fabrication of soft magnetic metal alloys in a variety of applications including high-performance motors, high-efficiency generators, solenoids, sensors, and the enabling magnetic shielding for high-reliability, high-performance Hall thrusters. Embodiments allow for reduced cost and lead-time for the production of components. In addition, embodiments also allow for the spatial control of the developing microstructure to, spatially, optimize magnetic and mechanical properties for enhanced system performance. The ability of embodiments to use a variety of fabrication techniques further allows for the formation of any complex geometry. For example, the use of a powder bed fusion (PBF) process, in accordance with various embodiments, enables fabrication of more complex geometries while still allowing microstructural control of the printed, annealed components.

Accordingly, embodiments allow for the end-to-end processing of selected soft magnetic alloy powders through custom magnetic/mechanical parameters in an additive deposition system to produce near fully dense (>99.5%) near-net shape soft magnetic components, and post-processing those components to target state-of-the-art magnetic properties or trading some magnetic performance for mechanical properties such as hardness and strength.

EXEMPLARY EMBODIMENTS

The following discussion sets forth embodiments where the soft magnetic alloy additive manufacturing processes according to embodiments may find particular application. It will be understood that these embodiments are provided only for exemplary purposed and are not meant to be limiting.

Example 1: Studies of Microstructure Properties of Soft Magnetic Elements

Processing parameters according to embodiments were studied to determine how to implement dense Hiperco® 50 test rings for DC magnetic testing. Magnetic testing of these rings in as printed and annealed conditions are summarized in FIGS. 4 to 7.

Figure 4A:
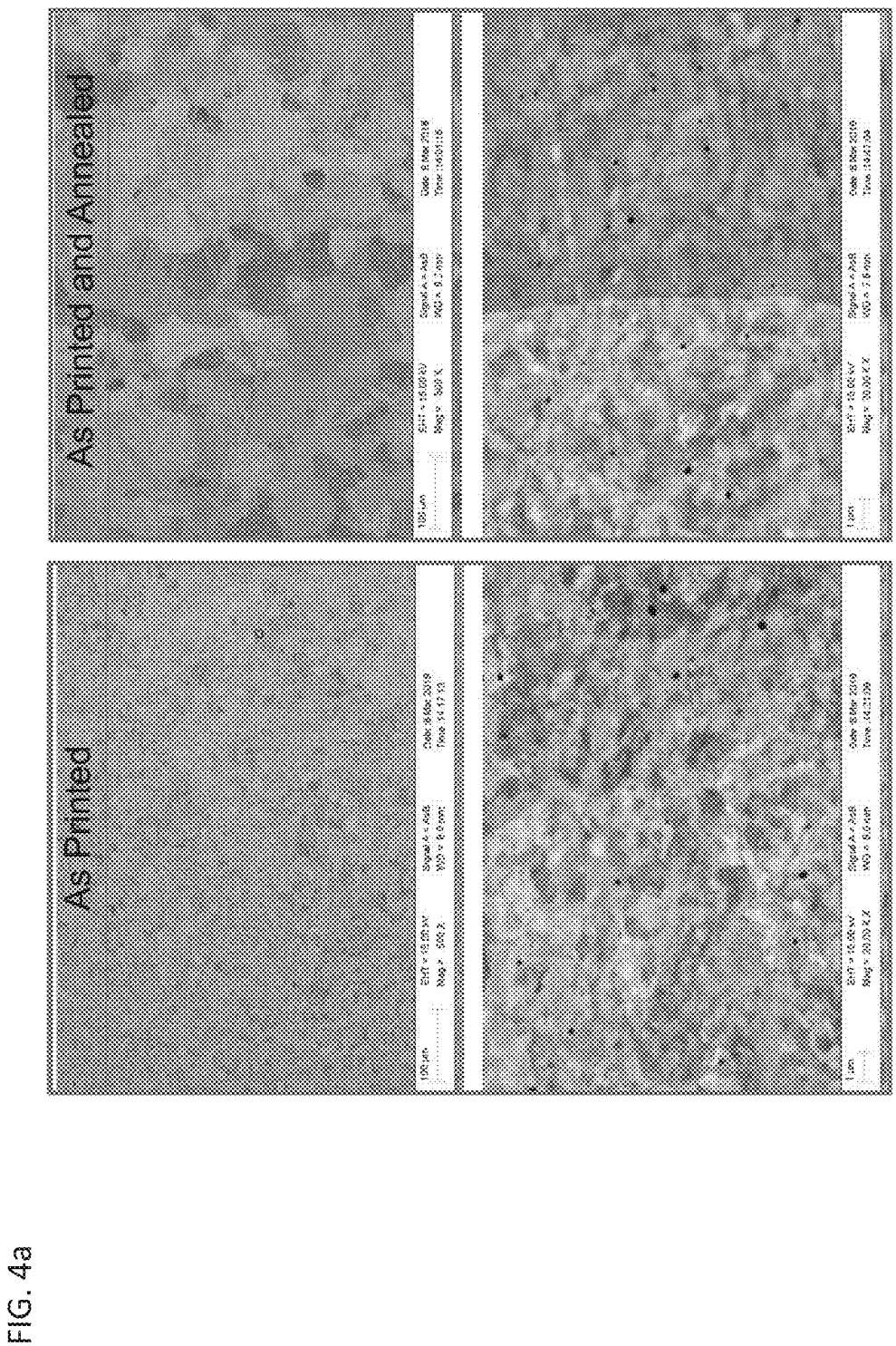
FIGS. 4a and 4b provide SEM images of a magnetic element formed in accordance with embodiments of the invention.
Figure 4B:
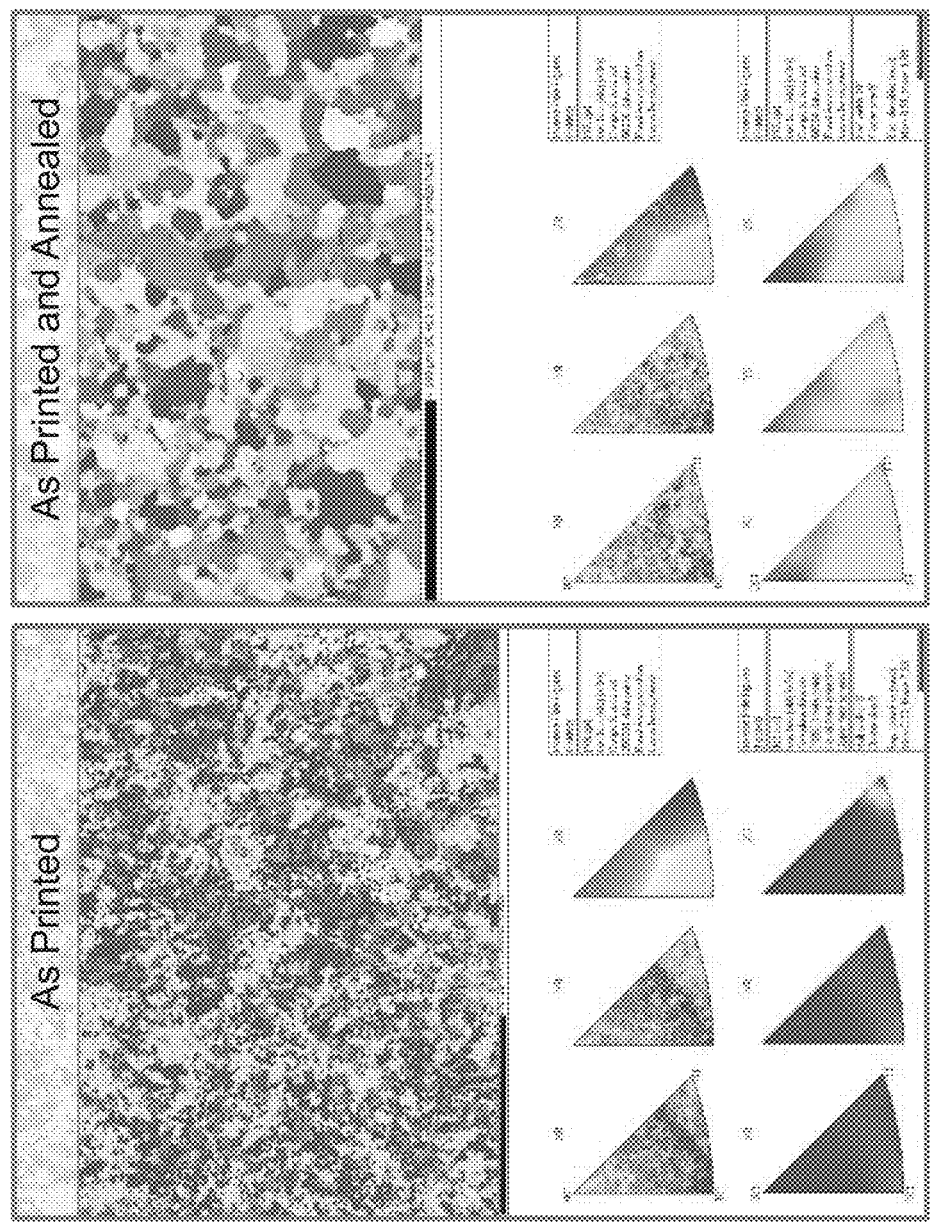
Figure 5:
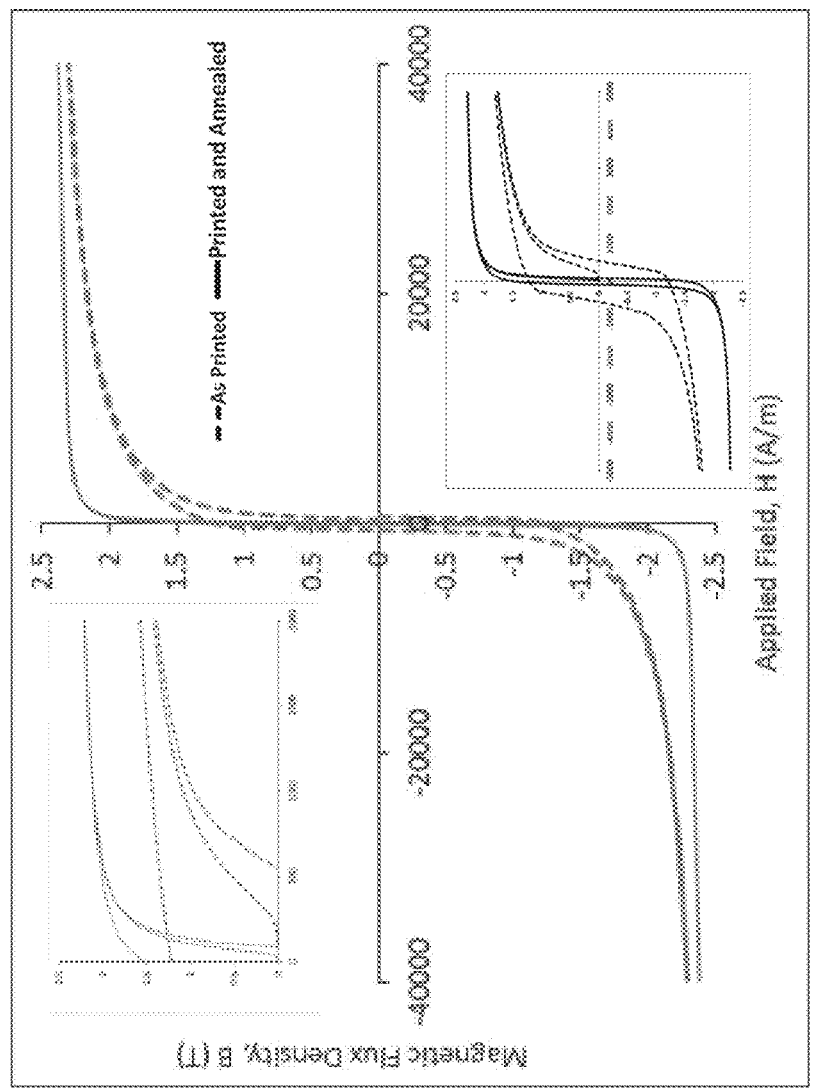
FIG. 5 provides a data graph of the magnetic flux of a magnetic element formed in accordance with embodiments of the invention.
Figure 6:
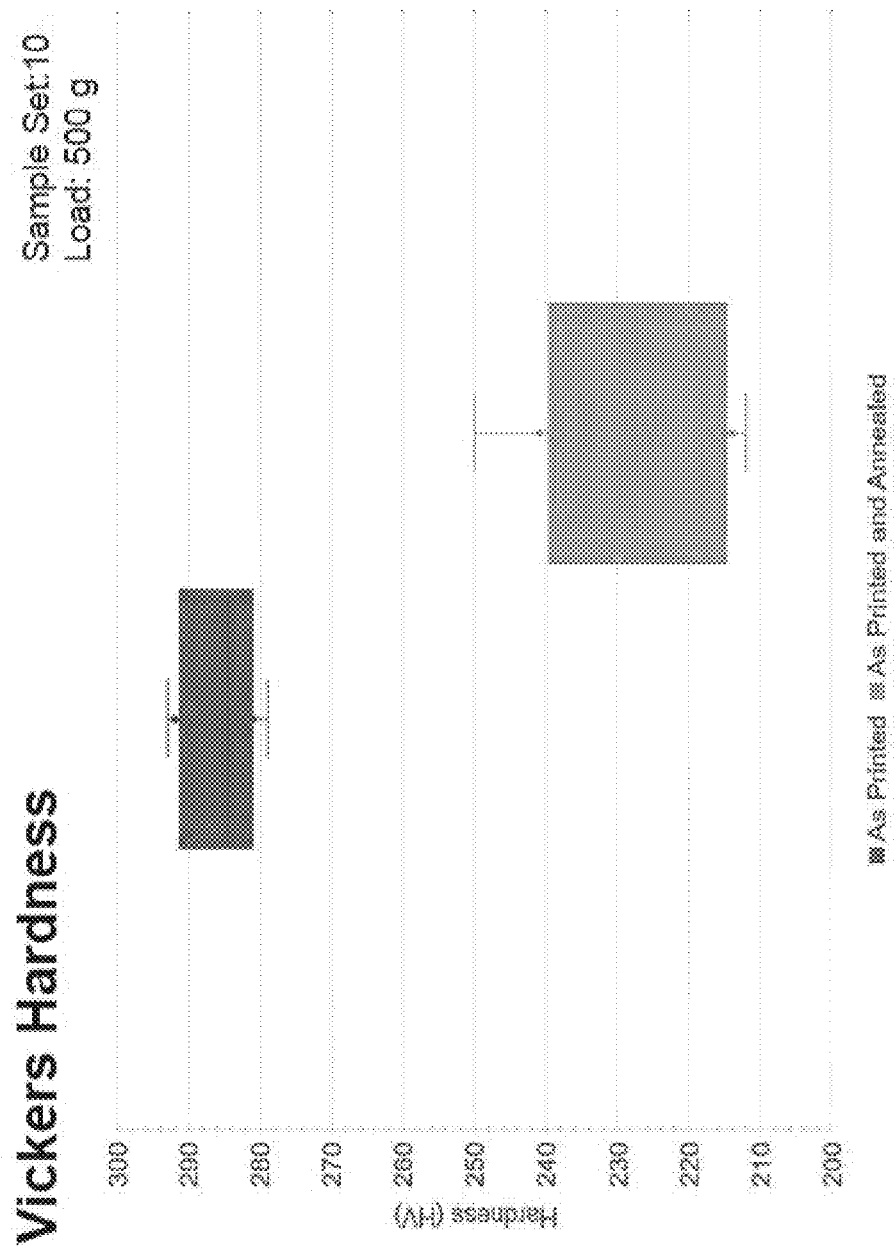
FIG. 6 provides a data graph of the Vickers hardness of a magnetic element in accordance with embodiments of the invention.
Figure 7A:
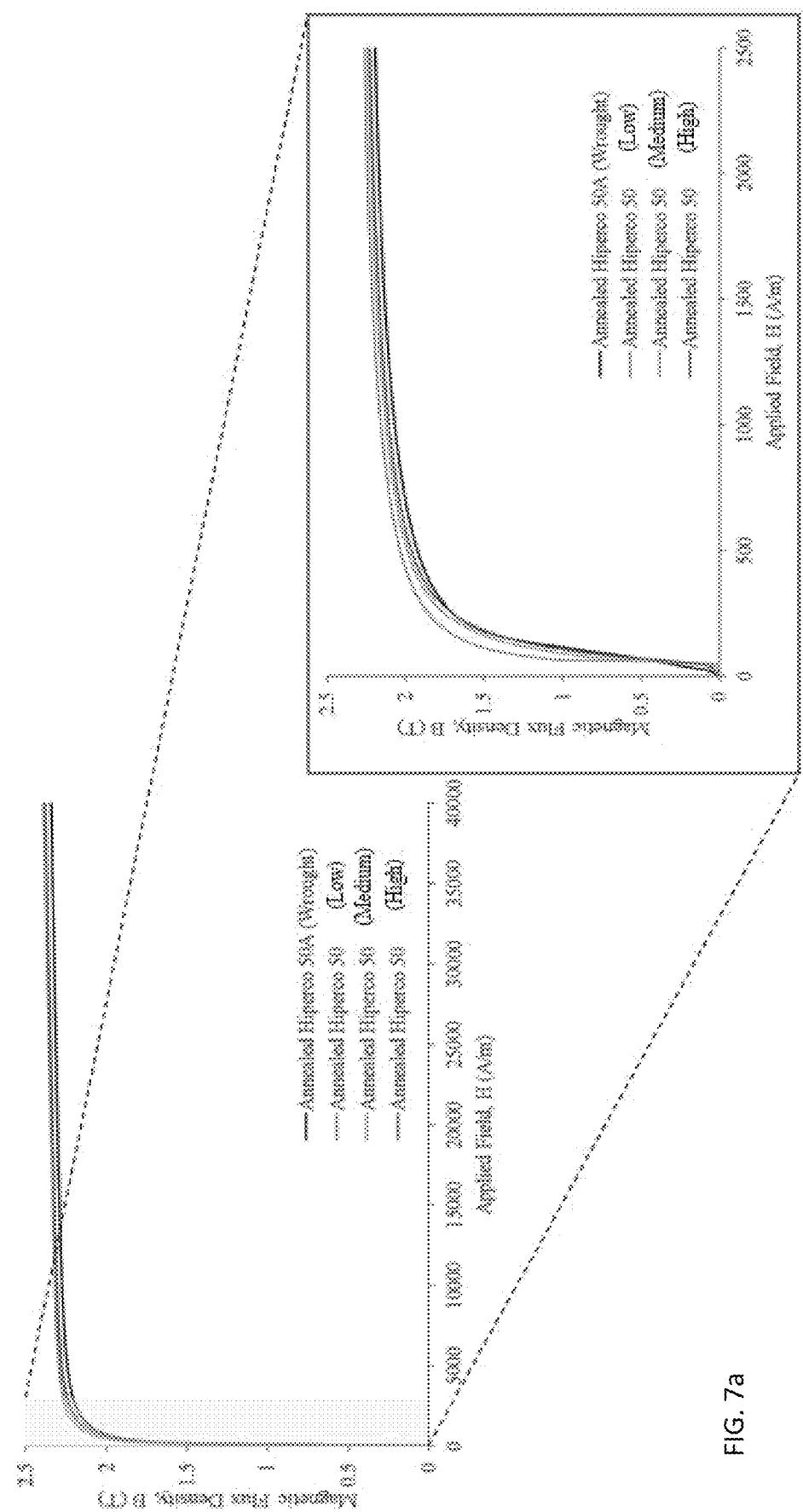
FIG. 7a provides a pair of data graphs of the magnetic flux of a magnetic element in accordance with embodiments of the invention.

First, FIGS. 4a and 4b provide a set of SEMs demonstrating the effect on the grain size of an as-printed element formed according to embodiments from a Hiperco® 50 metal alloy. As shown, the grain size enlargens under the effect of the annealing process. This has a number of effects on both the magnetic and mechanical properties of the element. Specifically, as shown in FIG. 5, the magnetic flux density of the element increases, and as shown in FIG. 6, the hardness of the element decreases. Finally, FIGS. 7a and 7b provide graphs and tables summarizing the effect of varying annealing conditions on the magnetic properties of embodiments of magnetic elements. As shown, the magnetic properties are sensitive to the specific conditions, and show significantly degraded magnetic properties when minimum heat-treatment parameters, according to embodiments are not met.

The magnetic properties against state of the art machined elements are summarized in Table 3, and demonstrate that additively manufactures Hiperco® 50 can be fabricated according to embodiments and demonstrate magnetic properties equal to or exceeding the current state-of-the-art (SOA) Hiperco® 50 magnetic elements.

TABLE 3

| Magnetic/Mechanical Properties in As-Printed/Annealed States | | | |
|---|---|---|---|
| Property | As-Printed | Annealed | SOA* |
| $B_r$ (T) | 1.21 | 1.51 | |
| Hc (Oe) | 6.819 | 1.099 | 1.131-2.513[a] |
| $\mu_{max}$ | 940 | 7597 | 4000-8000[b] |
| Max Test B (T) | 2.30 | 2.39 | 2.3[b] |

*State-of-the-Art:
[a] R. H. Yu, et a., IEEE Trans. Magn., 36 (2000), 3388-3393
[b] R. S. Sundar, et al., Int. Mat. Rev. (2005)

Note, that tests on the magnetic properties of soft magnetic elements formed using additive manufacturing methods according to embodiments show that there is very little anisotropy. This can be contrasted with conventional wrought materials that show significant anisotropy in material properties. This anisotropy can further complicate the subsequent manufacturing of and be detrimental to the performance of the final part. Accordingly, the relative lack of anisotropy in elements made in accordance with embodiments provides another advantage to forming complex elements having soft magnetic properties.

In summary, these results demonstrate that near net shape magnetic elements can be formed from a Hiperco® 50 metal alloy using methods according to embodiments. These elements have densities approaching ~99% using specific energies on the order of 46 J/mm$^2$. What is more, elements undergoing the full manufacturing process: additive manufacturing and combined heat treatment achieve magnetic properties comparable or exceeding state-of-the-art wrought magnetic elements. These results also demonstrate the unexpected sensitivity of these elements to variations in heat treatments, and the importance of maintaining strict control in accordance with embodiments of the process to ensure the magnetic suitability of additively manufactured magnetic elements.

Example 2: Studies of Additive Manufacturing Gradient Material Elements

As previously discussed, while the magnetic properties of soft magnetic alloys, such as Fe—Co alloys for example, are among the highest of any known material, their strength, ductility and fusion weldability are very poor. With respect to fusion weldability specifically, Fe—Co alloys are subject to low elongation failure, no necking and brittle microscopic features. While there has been some recent success with solid state welding, such as, for example, friction inertia welding, the final fracture is brittle in nature and the Fe—Co is prone to fracture away from the weld. Various embodiments are directed to the use of additive manufacturing techniques to directly build soft magnetic elements in combination with other materials and elements formed of different materials thus removing the need for welds or other types of joints. Embodiments may employ gradient additive manufacturing to alter the composition of the alloys across the part to allow fabrication of monolithic structures with spatially variant properties without the need for mechanical fasteners. Such gradient techniques, according to embodiments, can enable new design possibilities and improve performance in severe mechanical environments. Suitable gradient materials may include, but are not limited to austenitic stainless steel alloys and ferrous metal alloys (e.g., Invar, Inconel, Maraging SS, etc.) FIGS. 8a to 8e demonstrate elements and the properties of elements formed using gradient techniques in accordance with embodiments.

Figure 8A:
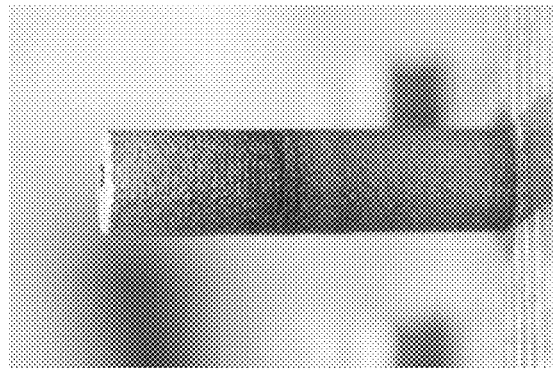
FIG. 8a provides an image of a gradient magnetic element in accordance with embodiments of the invention.

First, FIG. 8a shows an image of a gradient rod formed in accordance with embodiments. The rod has a ½ inch diameter and is graded over a ~3 mm thick region over a series of ~13 layers. (It will be understood that these gradient length and layer numbers are exemplary and any desired length scale and number of gradient layers may be used to accomplish a specific material goal.) The exemplary rod transitions between SS316 and Hiperco® 50, where in this instance the SS316 was deposited first and transitioned to Hiperco® 50, although any order may be used. In addition, although this is a binary transition, it will be understood that multiple transitions between two or more materials may be undertaken. FIG. 8a shows that the gradient part may be formed according to embodiments in a unitary piece without any mechanical interconnection and without defect (e.g., crack free).

Figure 8D:
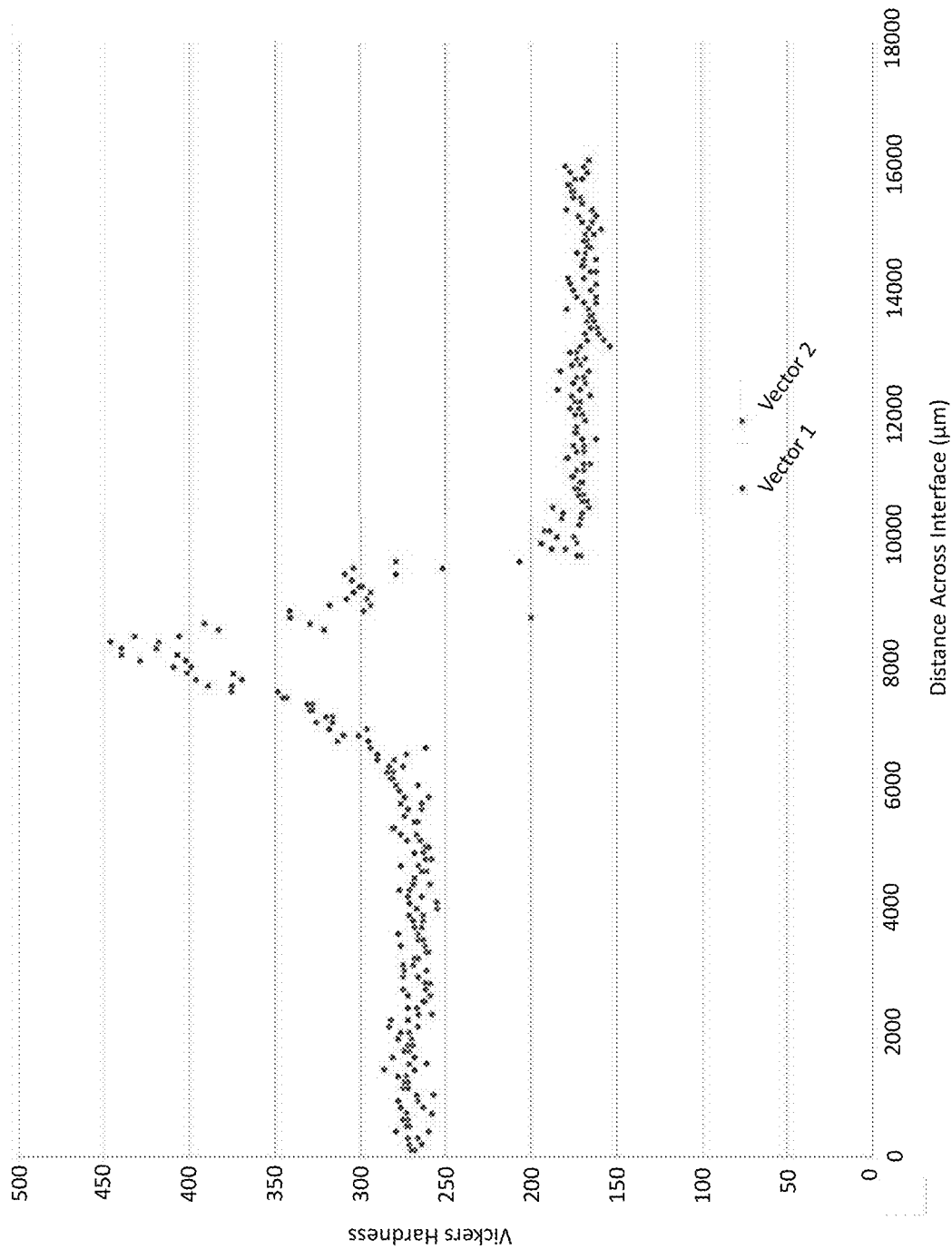
FIG. 8d provides a data graph of the microhardness of a gradient magnetic element in accordance with embodiments of the invention.
Figure 8E:
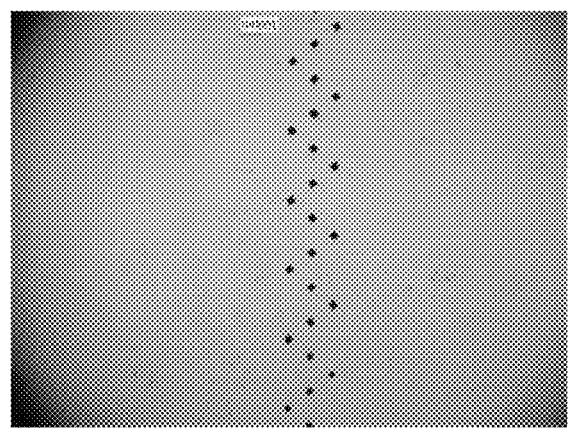
FIG. 8e provides micrograph images of a gradient magnetic element in accordance with embodiments of the invention.
Figure 8E:
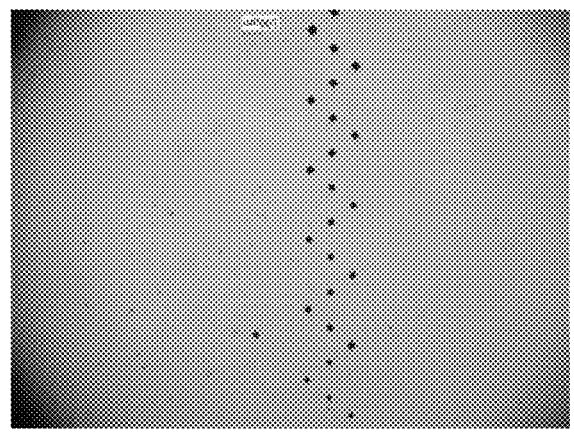
Figure 8E:
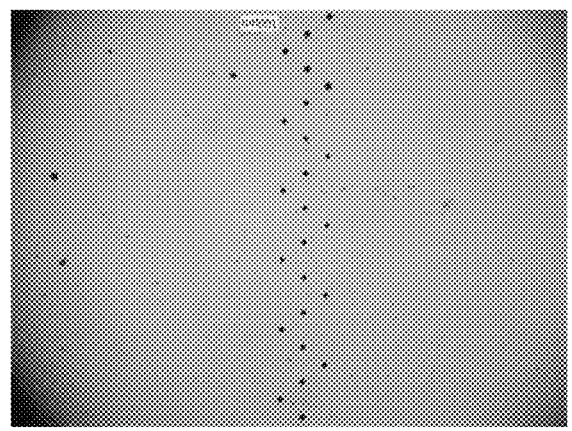

FIG. 8b shows the formed rod element in an SEM image revealing the formation of columnar grains nearer to the transition between the materials (e.g., transition to BCC region). In turn, FIG. 8C shows an expanded view of one region showing the relatively sharp transition between FCC and BCC crystal structures. These SEMS demonstrate that gradient elements can be formed that have continuous transitions from one material to another even where the materials have radically different crystal structures. FIG. 8d shows the microhardness value of the gradient rod element in a data plot where the left hand is the Hiperco® 50 alloy and transitions to SS316 on the right. As shown, hardness peaks in the transition zone between the ends. FIG. 8e demonstrates micrograph images showing that there are no cracks in the material and minimal pores indicating that a high quality, defect free gradient elements can be formed according to embodiments. The availability of such a process provides a method for manufacturing complex magnetic elements with diverse materials integrally interconnected therewith without the need for welding or other mechanical interconnection. What is more, the ability to have a pure Fe—Co material means that the element should behave magnetically identically to previously described pure heat treated elements.

Example 3: Studies Implementing Hall Thruster Elements

Hall thrusters are an important element in the suite of propulsion technologies being contemplated for use in many space missions. In some embodiments, additive manufacturing methods as described are used to rapidly manufacture magnetically shielded Hall thrusters elements. Specifically, in the following studies manufacturing parameters were developed to fabricate dense Hiperco® 50 test rings for DC magnetic testing in accordance with embodiments. Magnetic testing of these rings in as-printed and annealed condition demonstrate that additively manufactured Hiperco® 50 elements could be fabricated with magnetic properties equal to or exceeding the current state-of-the-art (SOA).

Figure 9A:
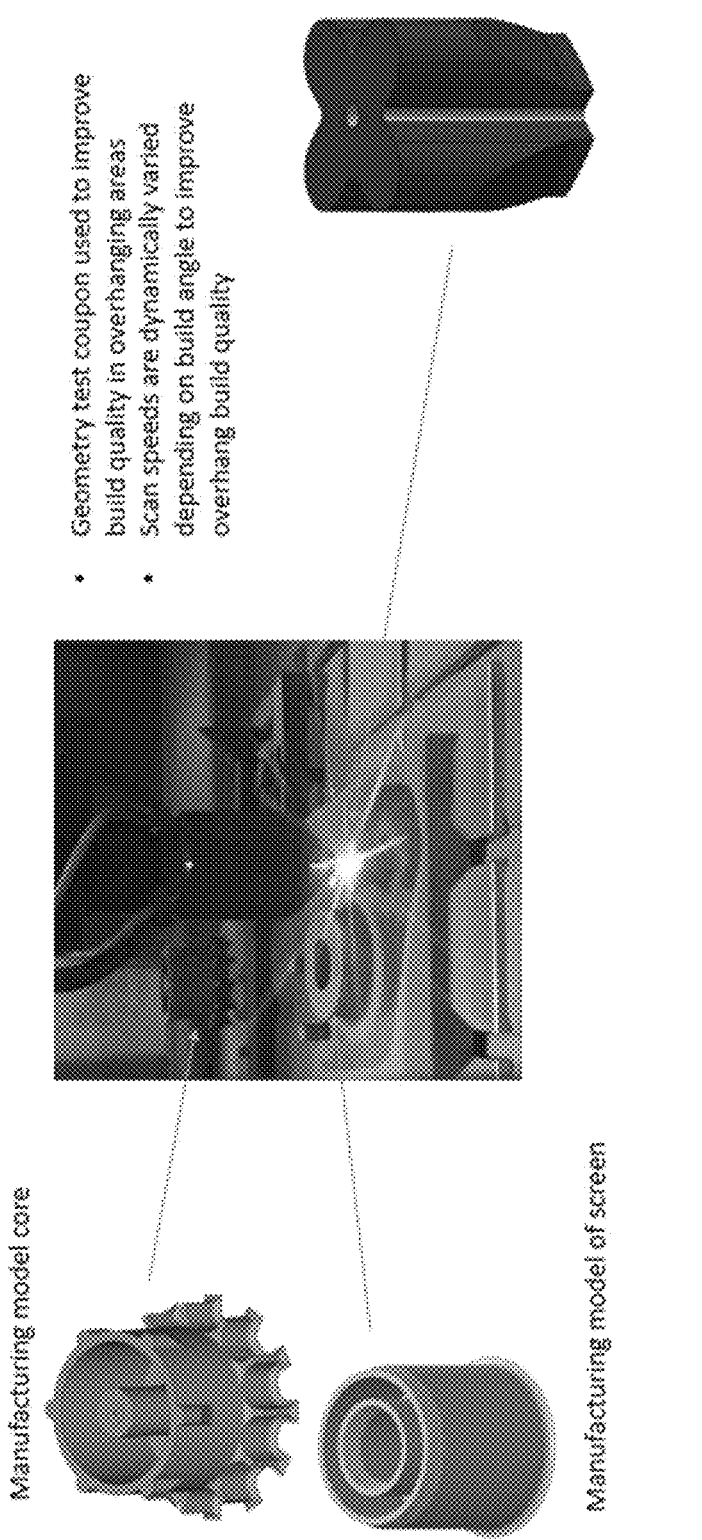
FIG. 9a provides diagrams of exemplary Hall thruster elements capable of being manufacture in accordance with embodiments of the invention.

First, as shown in FIG. 9a, manufacturing models were produced from a base MASMI Hall thruster design. To ensure the thruster design was suitable for manufacture by additive processes according to embodiments, models accounted for additional material to allow for finish machining and un-supported overhang areas of the design. Fillets were also added to the base for attachment to the build plate. Using such models it is possible to varying the manufacturing parameters (e.g., scan speeds and so on) to improve on the quality of difficult overhang areas of the design.

Figure 9B:
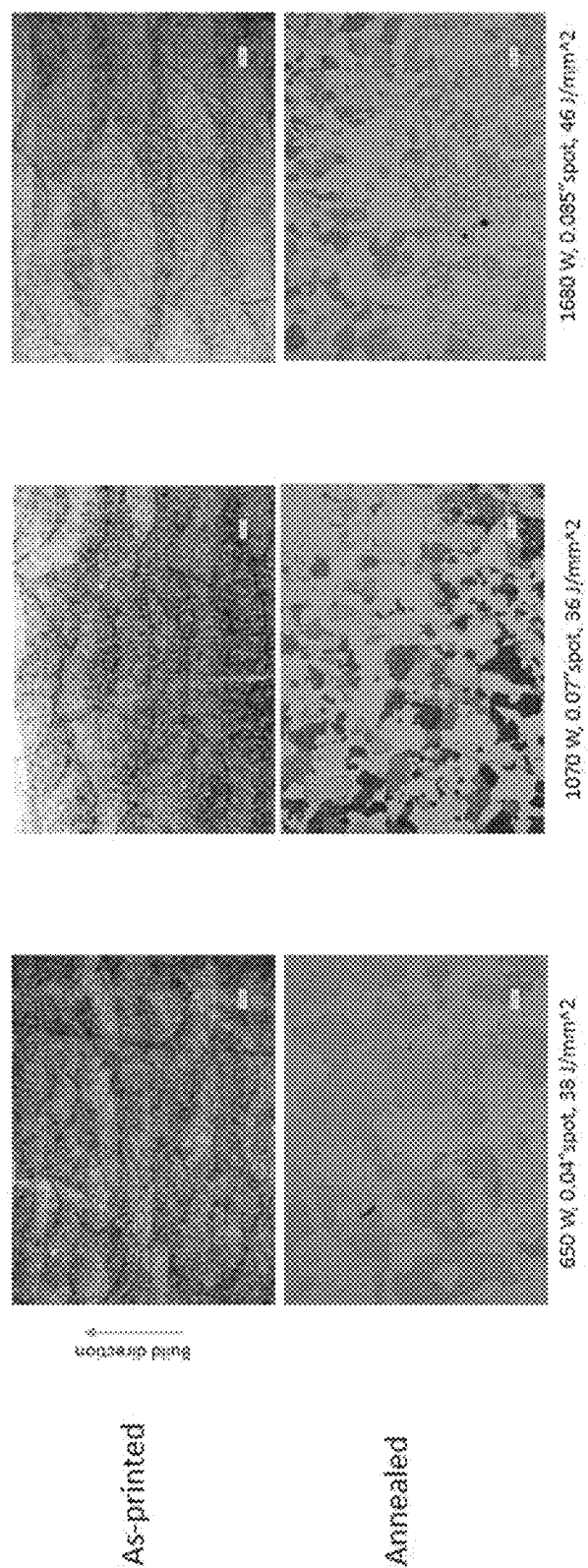
FIG. 9b provides images of as-printed and annealed grain structures of elements additively manufactured in accordance with varying parameters in accordance with embodiments of the invention.
Figure 9C:
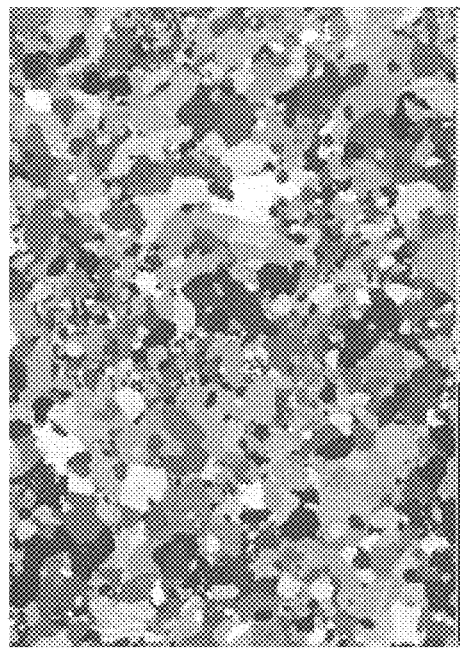
FIG. 9c provides SEM images of annealed grain structures of elements additively manufactured in accordance with varying parameters in accordance with embodiments of the invention.
Figure 9C:
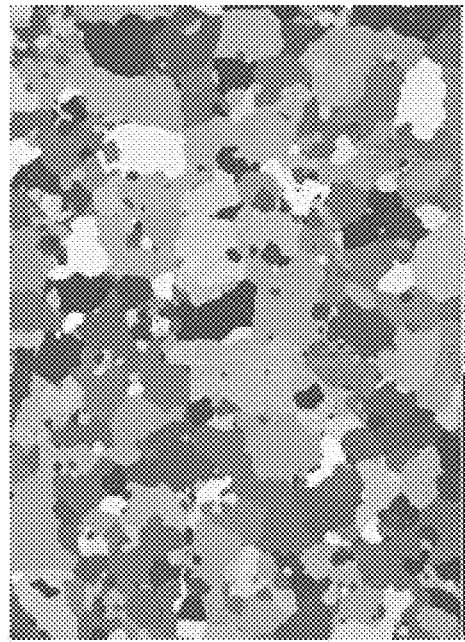
Figure 9D:
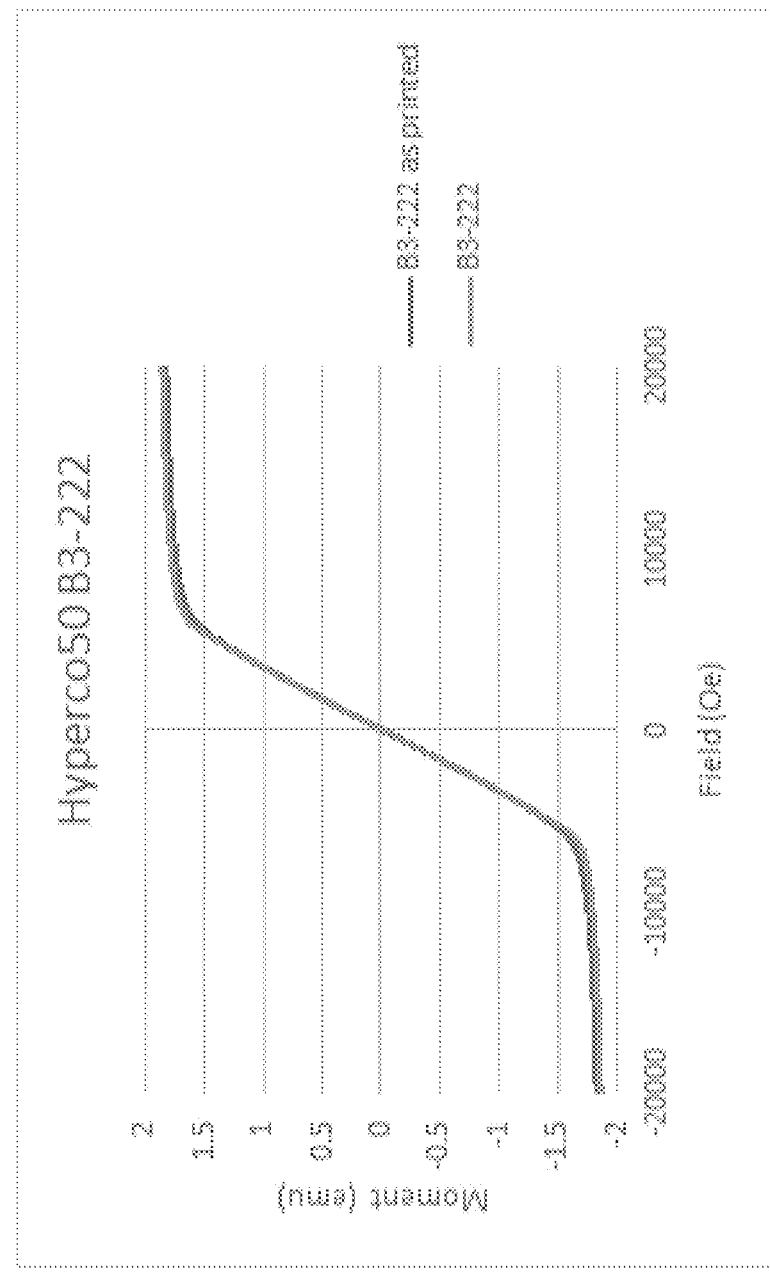
FIG. 9d provides a data graph of a VSM study conducted on as-printed and annealed Hiperco® 50 along the build direction and perpendicular to the build direction in accordance with embodiments of the invention.

As previously discussed, printing process parameters can effect recrystallization and grain growth kinetics, and larger grain sizes can be used to ensure improved magnetic properties, while smaller grain sizes can lead to improved mechanical properties within as-built magnetic elements. Although not to be bound by theory, a possible mechanism relates to residual stress, where smaller melt pools (e.g., more layers and melt pool boundaries) can result in higher residual stress. Regardless of the mechanism, as shown in the micrographs depicted in FIG. 9b, different manufacturing parameters (e.g., laser spot size, energy flux, etc.) can be applied locally within a thruster element to induce desire mechanical or magnetic properties A similar result can be seen in the SEM images of FIG. 9c, which show that significant grain size difference can be seen between low and high power builds according to embodiments. Moreover as shown in FIG. 9d, VSM data indicates no evidence of magnetic anisotropy in printed materials. This confirms the magnetic advantages of additive manufacturing processes according to embodiments.

Figure 9F:
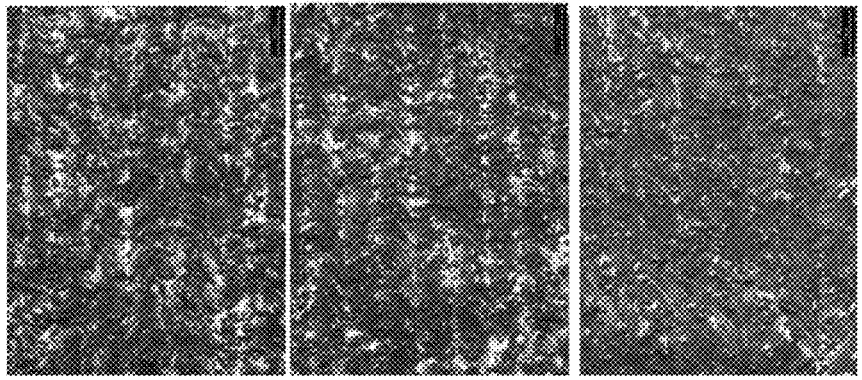
FIG. 9f provides grain structure of the exemplary magnetic rings of FIG. 9e.
Figure 9E:
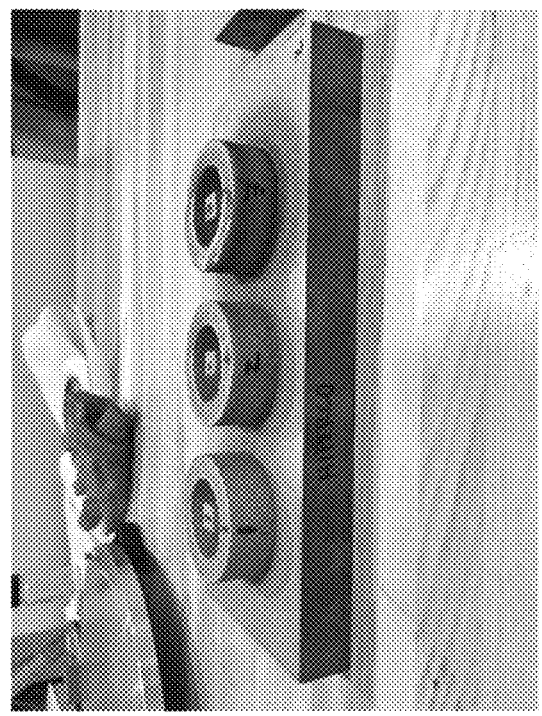
FIG. 9e provides an image of exemplary magnetic rings formed from Hiperco® 50 in accordance with embodiments of the invention.
Figure 9G:
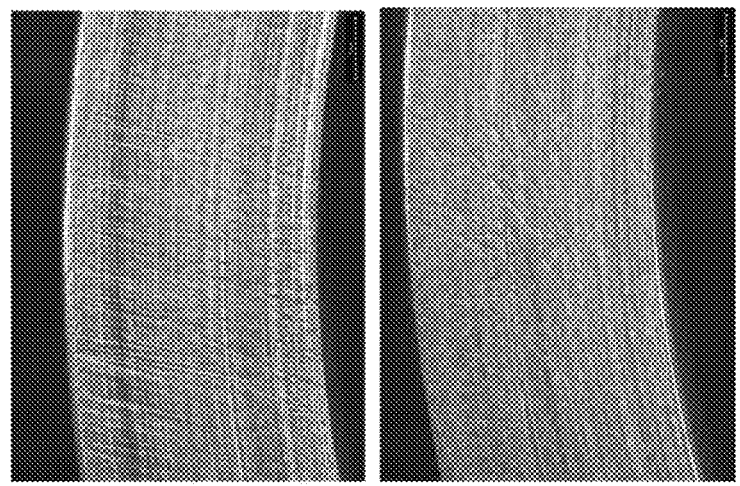
FIG. 9g provides top surface views of the exemplary magnetic rings of FIG. 9e.
Figure 9G:
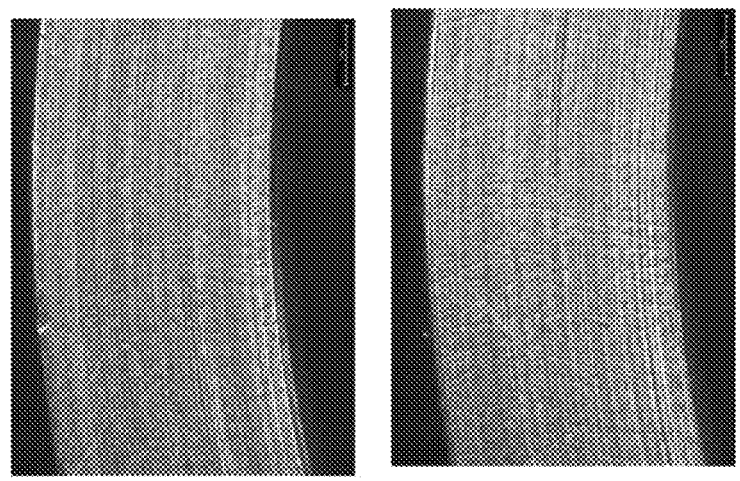
Figure 9G:
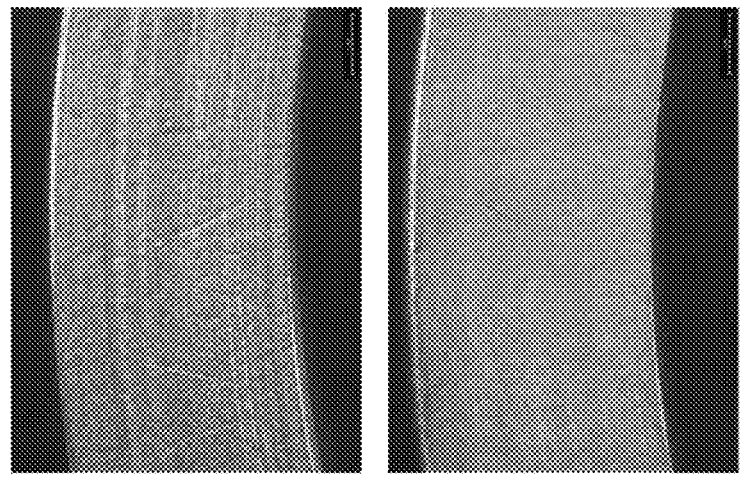

FIG. 9e shows an image of a Hiperco® 50 magnetic test ring and metallography blanks printed with varied energy density in accordance with embodiments. In these embodiments, the layer thickness and laser spot were held constant, and scan speed and laser power were varied in the following configurations: High/Low/High and Low/High/Low. These test coupons demonstrate the possibility of controlling magnetic & mechanical properties within a part, as shown by the difference in deposited structures provided in FIG. 9f. A more detailed view of the grain size variance between the different sample elements is provided in FIG. 9g. These views clearly show the possibility of using variance in additive manufacturing parameters, according to embodiments, to enable different grain sizes and thus concomitant variance in the magnetic and mechanical properties of the thruster element.

Figure 9I:
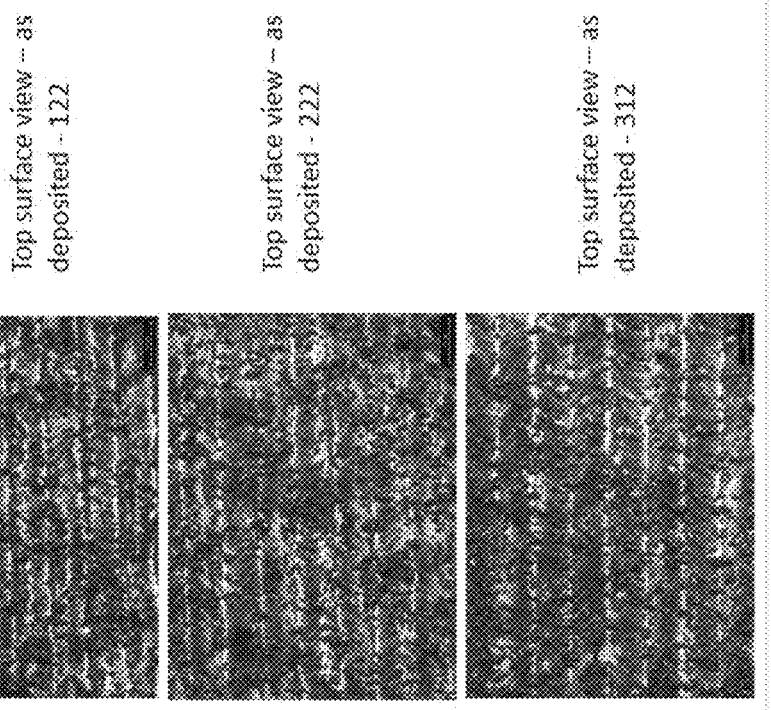
FIG. 9i provides grain structure of the exemplary magnetic rings of FIG. 9h.
Figure 9H:
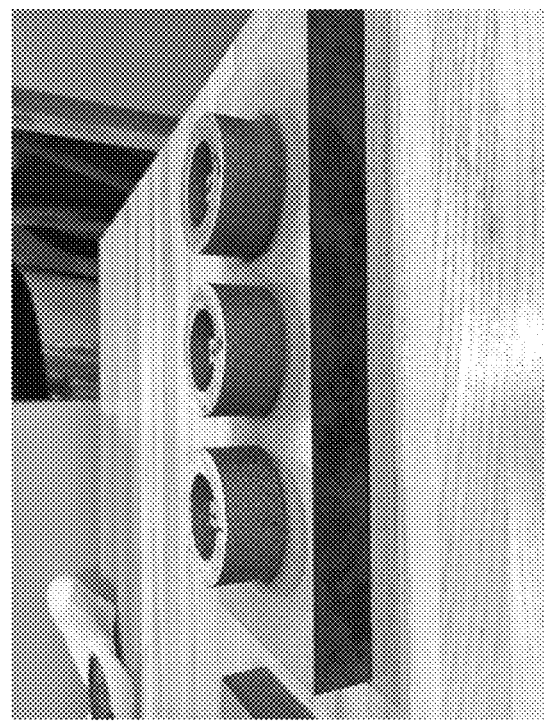
FIG. 9h provides an image of exemplary magnetic rings formed from Fe—Co in accordance with embodiments of the invention.
Figure 9J:
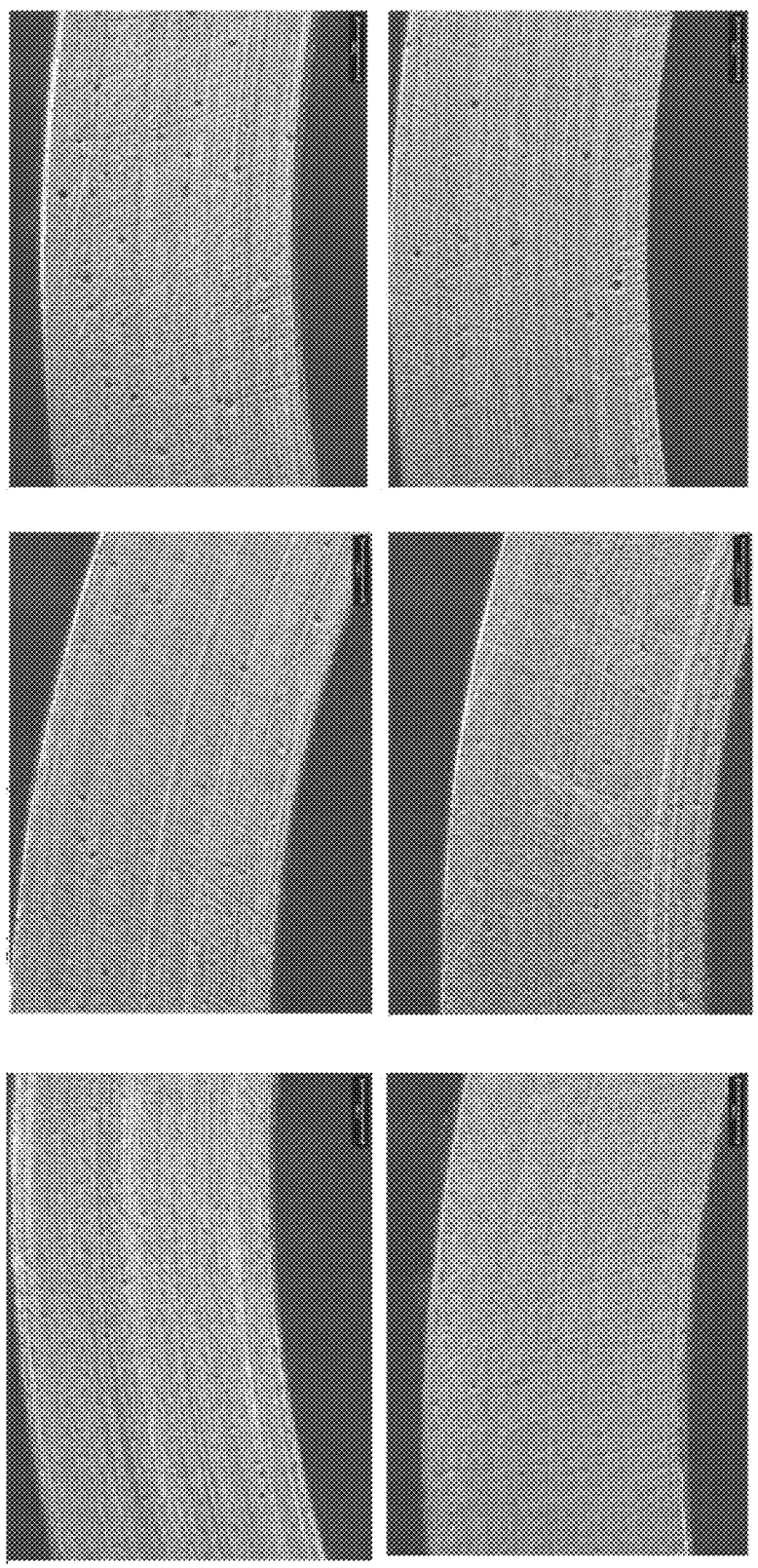
FIG. 9j provides top surface views of the exemplary magnetic rings of FIG. 9h.
Figure 9I:
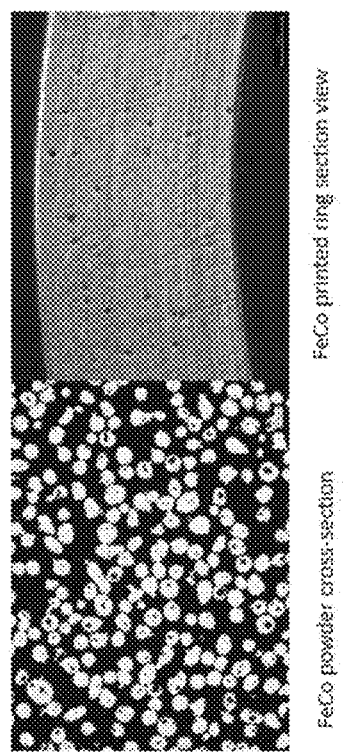

As previously discussed, binary FeCo is reported to have higher saturation and permeability with lower coercivity as compared to Hiperco® 50 (Fe-49Co-2V). In addition, it has higher electrical and thermal conductivities. However, FeCo has poor mechanical properties which make it difficult to form and machine. Hence, Hiperco® 50 is the state of art alloy for forming magnetic elements in Hall thrusters. FIGS. 9h, 9i, and 9j provide the results of printing experiments showing that embodiments of additive manufacturing may enable use of higher magnetic performance FeCo for thruster applications, and also allow for variance of mechanical and magnetic properties by changing manufacturing parameters, as discussed above.

Figure 9K:
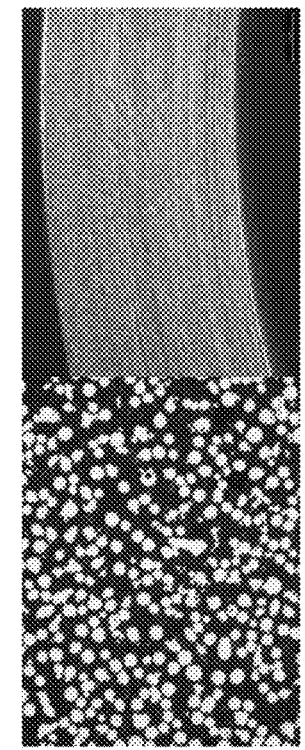

FIGS. 9k and 9l also show images of another possible parameter that can be used to alter the properties of the manufactured element, namely the porosity of the powder feedstock. As shown in the images the completed powder cross-sectional analysis on both feedstock materials shows an observed correlation between porosity in the manufactured part and the powder feedstock.

Figure 9M:
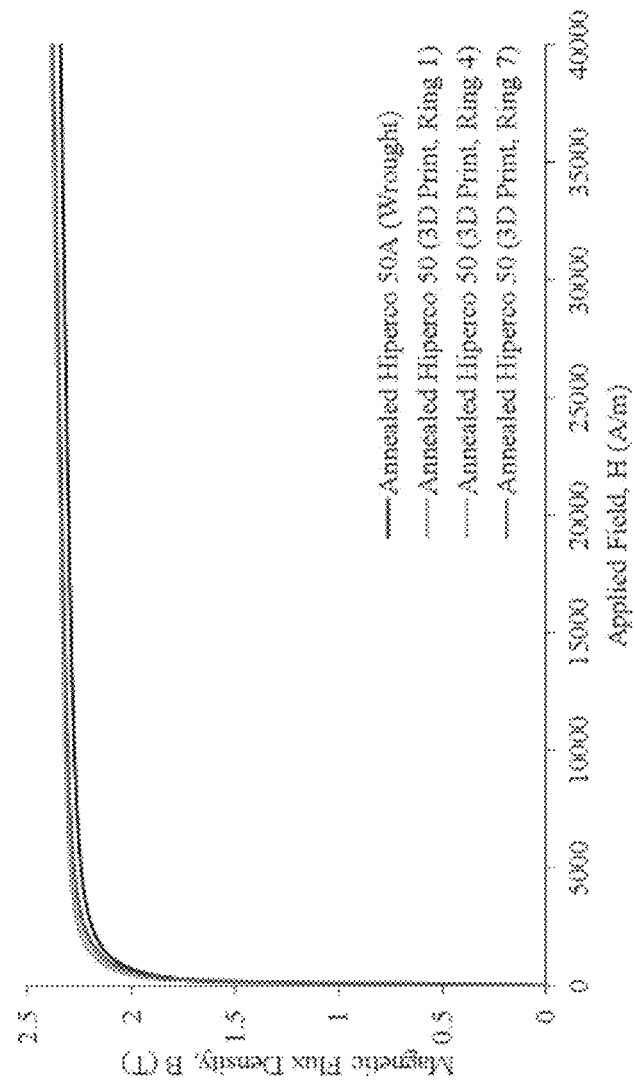
FIG. 9m provides a data graph of magnetic flux densities for Hiperco® 50 magnetic rings in accordance with embodiments of the invention.

FIG. 9m provides magnetic flux density measurements of the Hiperco50 as-printed rings. As shown, all of the rings show magnetic properties that are at least as good as state-of-art wrought magnetic ring elements. Although not shown, given the superior magnetic properties of the binary Fe—Co alloys, it is anticipated that those rings will show magnetic properties similarly superior to the Hiperco® 50 rings.

Taken together, the tests demonstrate the ability to additively manufacture magnetically shielded Hall thrusters using embodiments. This ability enables potential performance improvements through the ability to control the microstructure (and thus material properties), metallurgical gradients and integrated thermal management to improve system performance of larger thrusters, and near-net shape fabrication to reduce cost and schedule. These benefits can be mission enabling for the types of thrusters needed to explore and study the Solar System and beyond. By developing a thorough understanding of the process-structure-property-performance relationship for additive manufacturing of soft magnetic alloys and gradients future thruster designs can consider spatially controllable properties. Embodiments can also be applied to other areas where soft magnetic alloys could be beneficial, such as high efficiency motors.

Example 3: Studies of Energy Density Variance

In another exemplary study, the ability to vary the properties of elements based on varying the deposition energy in accordance with embodiments was studied. In these studies three ½ inch square rod coupons were deposited in accordance with embodiments with the energy density gradient patterns summarized in Table 4, below. In these samples the first segment (i.e., closest to the build plate was 20 layers thick and each of the second and third segments 15 layers thick. It will be understood that these thickness are only exemplary and many variations may be made.

TABLE 4

Energy Density Variance for Samples

| Sample # | Segment 1 | Segment 2 | Segment 3 |
|---|---|---|---|
| 1 | High | Low | High |
| 2 | High | Low | High |
| 3 | Low | High | Low |

Figure 10A:
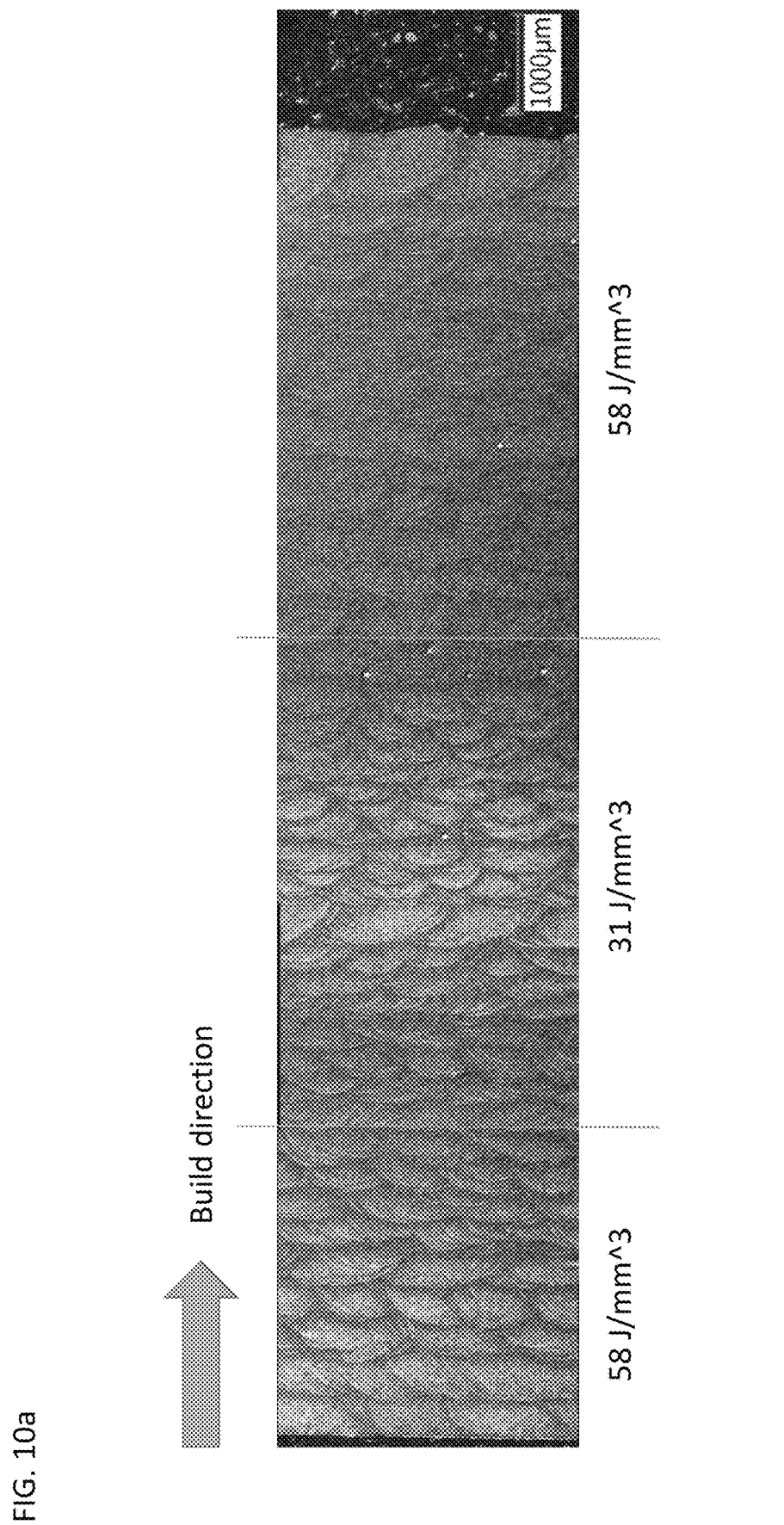
FIG. 10a provides a micrograph image of an element formed with an energy gradient deposition in accordance with embodiments of the invention.
Figure 10B:
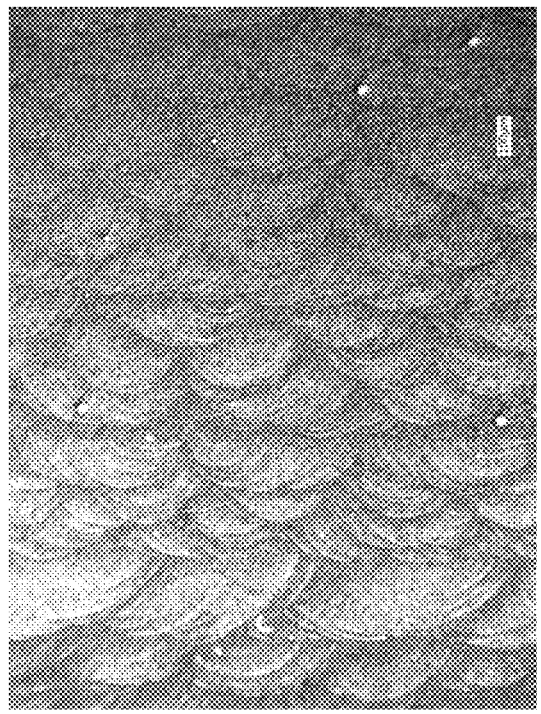
FIGS. 10b and 10c provide micrograph images of a region of the element of FIG. 10a formed with a high (10b) and low (10c) energy density deposition in accordance with embodiments of the invention.
Figure 10C:
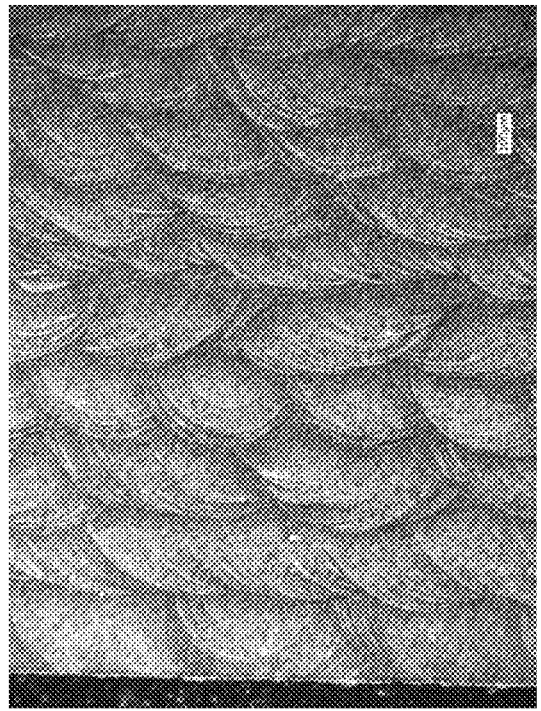

FIG. 10a provides an optical micrograph of a cross-section of Sample 1 showing the melt pool contrast across the sample as the energy density is altered from a high energy density deposition (~58 J/mm$^3$ (high) to 31 J/mm$^3$ (low) and back). FIGS. 10b and 10c provide close-up micrographs of the high (FIG. 10b) and low (FIG. 10c) melt pools. These images show that embodiments provide an ability to create continuous gradient elements by varying the energy density of deposition.

DOCTRINE OF EQUIVALENTS

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method for forming an element having magnetic properties comprising:
   providing a powderized feedstock of a magnetic alloy;
   additively manufacturing a magnetic element having a density of at least 98% from a plurality of successive layers of deposited powderized feedstock using a thermal energy source having a specific energy of deposition between about 30 and 60 J/mm$^2$; and
   heat treating the magnetic element comprising:
      annealing the magnetic element in a vacuum atmosphere at a temperature between about 830° C. and 875° C. for at least 230 minutes,
      quenching the annealed magnetic element to at least below 520° C. at a cooling rate of at least 70° C./hour in a vacuum atmosphere, and
      cooling the quenched magnetic element to at least below a temperature of 120° C. in an atmosphere having a concentration of oxygen less than about 10 ppm;
   wherein the heating and cooling of the magnetic element during the additive manufacturing and heat treating creates an internal energy that at least partially determines the grain structure of the magnetic alloy of the magnetic element; and
   wherein the cooling is conducted in a partial atmosphere of an inert gas.

2. The method of claim 1, wherein the magnetic alloy is a Fe—Co alloy.

3. The method of claim 2, wherein the magnetic alloy further comprises V.

4. The method of claim 3, wherein the magnetic alloy is Hiperco® 50.

5. The method of claim 1, wherein the vacuum atmosphere has a pressure below 1×10$^{-4}$ Torr.

6. The method of claim 1, wherein the annealing temperature is between about 845° C. and 875° C.

7. The method of claim 1, wherein the additive manufacturing process is selected from the group consisting of direct energy deposition (DED) and powder bed fusion (PBF).

8. The method of claim 1, wherein the thermal energy source is a laser.

9. The method of claim 1, further comprising modifying the internal energy of the magnetic alloy prior to the heat treating such that a desired grain structure will be formed in the magnetic alloy of the heat treated magnetic element.

10. The method of claim 9, wherein the internal energy is modified by controlling a thermal energy source parameter selected from the group consisting of spot size, raster speed, and power.

11. The method of claim 9, wherein the grain structure of the magnetic alloy is varied within the magnetic element.

12. The method of claim 11, wherein the grain structure varies along a radial direction of the magnetic element.

13. The method of claim 11, wherein the variance of the grain structure leads to variance in one or both of a magnetic property of the magnetic alloy, selected from the group consisting of coercivity, permeability, magnetic saturation, core loss and flux density; and a mechanical property of the magnetic alloy selected from the group consisting of hardness and strength.

14. The method of claim 1, wherein the method further comprises:
providing at least one additional feedstock alloy; and
varying the composition of the alloy being additively manufactured between at least the one additional feedstock alloy and the magnetic alloy such that the magnetic element has at least a first portion formed from the magnetic alloy, at least a second portion formed from the at least one additional alloy, and at least a third portion formed by compositional gradients therebetween.

15. The method of claim 14, wherein the magnetic alloy is an Fe—Co alloy and the at least one additional alloy is selected from the group consisting of stainless steel alloys and ferrous metal alloys.

16. The method of claim 14, wherein there are at least two additional feedstock alloys.

17. The method of claim 1, wherein the magnetic element is selected from the group consisting of motors, generators, solenoids and switches, sensors, transformers, and Hall thrusters.

* * * * *